United States Patent
Burlinson et al.

(10) Patent No.: US 10,571,947 B2
(45) Date of Patent: Feb. 25, 2020

(54) INCREASING THE DEMAND REDUCTION EFFECTIVENESS OF AN ENERGY STORAGE SYSTEM

(71) Applicant: STEM, Inc., Milbrae, CA (US)

(72) Inventors: Jon Burlinson, San Jose, CA (US); Chris Benjamin, Walnut Creek, CA (US); Ben Kearns, San Francisco, CA (US); Garrison Venn, Franklin, TN (US)

(73) Assignee: STEM, INC., Millbrae, CA (US)

( * ) Notice: Subject to any disclaimer, the term of this patent is extended or adjusted under 35 U.S.C. 154(b) by 442 days.

(21) Appl. No.: 15/199,432

(22) Filed: Jun. 30, 2016

(65) Prior Publication Data
US 2017/0329361 A1     Nov. 16, 2017

Related U.S. Application Data

(60) Provisional application No. 62/336,517, filed on May 13, 2016.

(51) Int. Cl.
| | |
|---|---|
| *G05F 1/66* | (2006.01) |
| *G05B 19/042* | (2006.01) |
| *G05B 15/02* | (2006.01) |
| *H02J 3/28* | (2006.01) |

(52) U.S. Cl.
CPC .......... *G05F 1/66* (2013.01); *G05B 15/02* (2013.01); *G05B 19/042* (2013.01); *H02J 3/28* (2013.01)

(58) Field of Classification Search
CPC ........... G05F 1/66; G05B 11/01; G05B 15/02; G05B 19/042; G05B 2219/24136; H02J 3/28; H02J 5/00
USPC .................................................. 700/296
See application file for complete search history.

(56) References Cited

U.S. PATENT DOCUMENTS

| | | | | |
|---|---|---|---|---|
| 5,723,971 | A * | 3/1998 | Sakai .................... | H01M 10/44 320/106 |
| 2012/0078818 | A1* | 3/2012 | Kumazawa ........... | G06Q 50/06 705/412 |
| 2012/0139475 | A1* | 6/2012 | Evans ................... | H02J 7/0085 320/106 |

(Continued)

*Primary Examiner* — Kenneth M Lo
*Assistant Examiner* — Michael W Choi
(74) *Attorney, Agent, or Firm* — Artegis Law Group, LLP

(57) ABSTRACT

In various embodiments, a hedge mode plugin increases the ability of an energy storage system to reduce the demand charges associated with purchasing electricity from a utility. A utility measurement interval (UMI) is divided into a pre-discharge phase and a subsequent compensatory charge phase. During the pre-discharge phase, the hedge mode plugin causes an energy storage device to discharge. At the beginning of the compensatory charge phase, the hedge mode plugin computes time-indexed charge values based on the total amount of energy that the energy storage device discharged during the pre-discharge phase. The hedge mode plugin then causes the energy storage device to charge based on at least one of the charge values. By systematically pre-discharging and re-charging the energy device, the hedge mode plugin optimizes the demand reduction effectiveness of the energy storage system during each UMI while stabilizing the state-of-charge of the energy storage device across multiple UMIs.

16 Claims, 10 Drawing Sheets

(56) References Cited

U.S. PATENT DOCUMENTS

| | | | | |
|---|---|---|---|---|
| 2012/0248873 A1* | 10/2012 | Oudalov | ................. | H02J 3/32 |
| | | | | 307/52 |
| 2014/0025215 A1* | 1/2014 | Carlson | ................. | H02J 3/383 |
| | | | | 700/292 |
| 2014/0125281 A1* | 5/2014 | Mitsutani | ............. | H01M 10/48 |
| | | | | 320/109 |
| 2016/0359342 A1* | 12/2016 | Katayama | ........... | H02J 13/0013 |
| 2017/0331291 A1* | 11/2017 | Ichino | ................. | H02J 7/0068 |

* cited by examiner

INCREASING THE DEMAND REDUCTION EFFECTIVENESS OF AN ENERGY STORAGE SYSTEM

CROSS-REFERENCE TO RELATED APPLICATIONS

This application claims the benefit of U.S. Provisional Patent Application Ser. No. 62/336,517 and filed on May 13, 2016. The subject matter of this related application is herein incorporated by reference.

BACKGROUND OF THE INVENTION

Field of the Invention

Embodiments of the present invention generally relate to energy storage systems and, more specifically, to increasing the demand reduction effectiveness of energy storage systems.

Description of the Related Art

As is well-known, utility companies typically generate electricity on-demand. Because utility companies do not store electricity for later use by customers, utility companies incur steep costs to deploy and maintain enough equipment to satisfy customer demand during demand peaks. Consequently, utility companies typically charge relatively large customers (e.g., commercial or industrial customers) an additional "demand" charge during these demand peaks. To determine the demand charge, a utility company tracks the average kilowatt (kW) demand of a customer over the course of a period of time, referred to herein as a "utility measure interval" (UMI). The utility company then sets the demand charge for the customer based on the highest average kW demand of all the UMIs included in a billing cycle.

As is well-understood, such demand charges can lead to significantly higher electricity costs for customers. For example, for a typical commercial or industrial customer, the demand charge may be between 30 and 70 percent of the total cost of energy over a billing cycle. To reduce the cost of electricity purchased from utility companies, some customers install energy storage systems on their premises that store energy in energy storage devices, such as large-scale batteries. Generally speaking, an energy storage system includes a system controller that attempts to discharge the energy storage device(s) when customer load is high and then charge energy storage device(s) when customer load is low. In so doing, a conventional system controller is configured to select and enforce one or more set-points. At any given time, the system controller attempts to configure the energy storage device(s) to discharge electrical energy at a rate that prevents the net load measured by the utility company from exceeding the relevant set-point during a particular UMI. In this fashion, the system controller attempts to constrain average kW demand of each UMI to a level that correlates with an acceptable demand charge.

One limitation of conventional system controllers is that they typically are unable to effectively manage average kW demand during a UMI when a "power limited event" occurs. A power limited event is when the customer load exceeds the capability of the energy storage device(s) to prevent the net load from exceeding the set-point during a given UMI. During UMIs that include power limited events, conventional system controllers may be unable to maintain the average kW demand of the UMI below the desired level. Such situations can occur when there is not enough time remaining in the UMI subsequent to the power limited event to discharge the energy storage device(s) long enough to bring the average kW demand back down to the set-point level. Thus, power limited events can oftentimes lead to unacceptably high demand charges that significantly impact the total cost of energy during a billing cycle.

For example, suppose that the power rating of an energy storage device is 100 kW and that the set-point during a UMI is 50 KW. Further, suppose that the customer load is 40 kW during the first 10 minutes of a 15 minute UMI and then 200 kW during the final 5 minutes of the UMI. During the first 10 minutes, because the customer load is below the set-point, a conventional storage controller does not discharge the energy storage device. During the final 5 minutes, a power limited event exists. Upon detecting the power limited event, the conventional storage controller immediately discharges all of the electricity stored in the energy storage device and requests the remaining required electrical energy (here, 100 kW) from the utility company. However, because there is only 5 minutes remaining in the UMI, there is not enough time left in the UMI to discharge the energy storage device long enough to limit the maximum average kW demand as measured by the utility company to 50 kW. More specifically, the maximum average demand for the UMI is 60 kW, and the demand charge associated with the billing cycle may increase dramatically.

As the foregoing illustrates, what is needed in the art are techniques for controlling energy storage devices to more effectively manage power limiting events.

SUMMARY OF THE INVENTION

Various embodiments of the present invention include a computer-implemented method for controlling an energy storage device to manage power limited events. The method includes computing multiple discharge values; during a pre-discharge phase of a utility measurement interval, causing the energy storage device to discharge electrical energy based on at least one discharge value included in the multiple discharge values; at a predetermined time that separates the pre-discharge phase from a compensatory charge phase of the utility measurement interval, computing multiple charge values based on a total amount of electrical energy that is discharged from the energy storage device during the pre-discharge phase; and during the compensatory charge phase, causing the energy storage device to perform a charging operation based on at least one charge value included in the multiple charge values.

Various embodiments of the present invention include a computer-implemented method of controlling discharge and charge cycles for an energy storage device. The method includes determining that a first time associated with a first command lies within a pre-discharge phase of a utility measurement interval; producing a second command based on at least one of the first command and a discharge guideline; causing the energy storage device to discharge based on the second command; determining that a second time associated with a third command lies within a compensatory charge phase of the utility measurement interval; producing a fourth command based on at least one of the third command and a charge guideline; and causing the energy storage device to charge or discharge based on the fourth command.

At least one advantage of the disclosed techniques is that the operation of the energy storage device is optimized to reduce demand charges. Notably, preemptively discharging the energy storage device during a first portion of the utility measurement interval enables the energy storage system to effectively mitigate a power limited event over the entire utility measurement interval irrespective of when the power limited event occurs. Consequently, the demand charges for the entire billing cycle may be reduced,

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
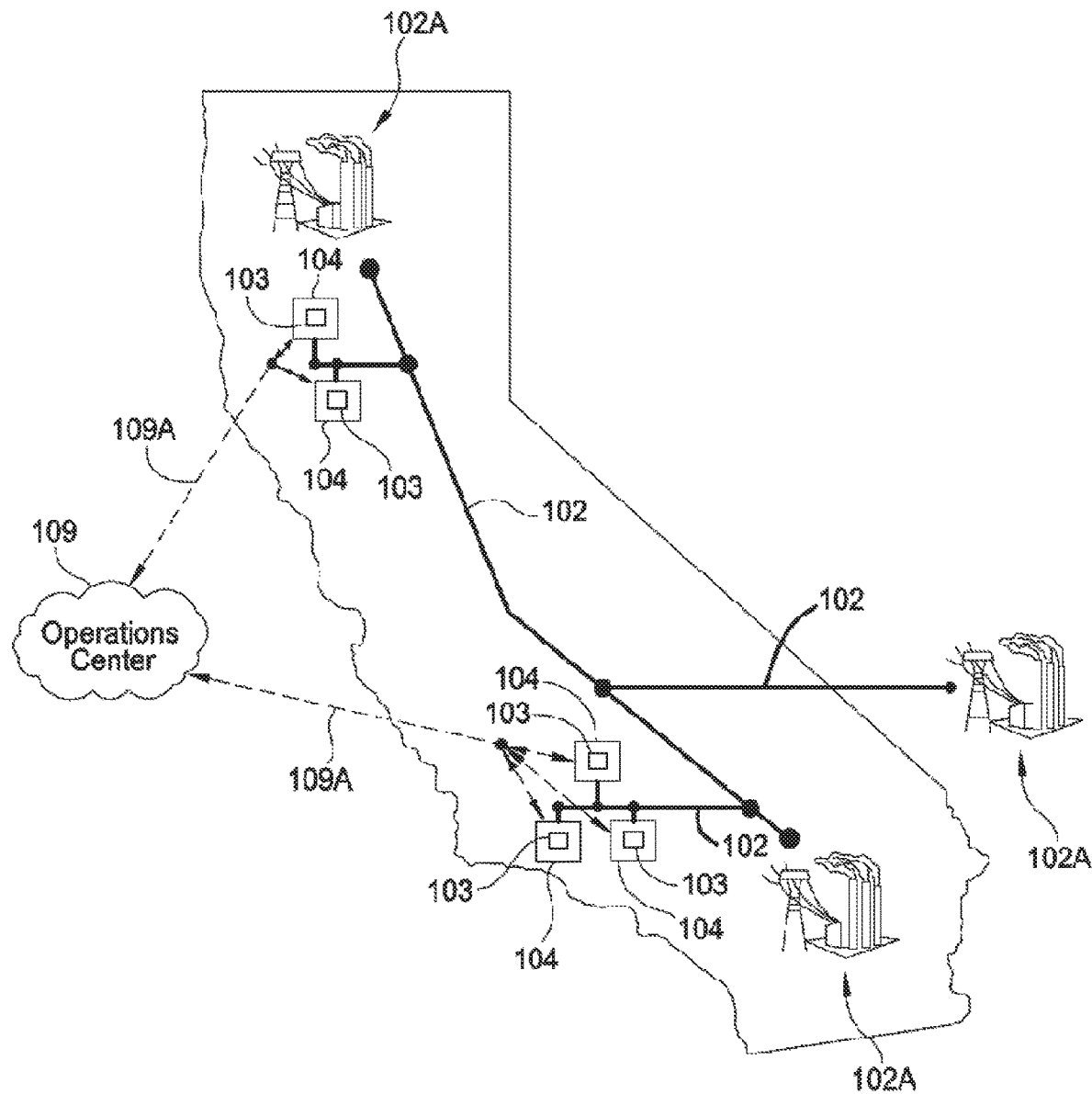
FIG. 1 is a conceptual illustration of multiple distributed energy storage systems that are positioned at different electric load locations and coupled to an electric grid, according to various embodiments of the present invention.

In the following description, numerous specific details are set forth to provide a more thorough understanding of the present invention. However, it will be apparent to one of skilled in the art that the present invention may be practiced without one or more of these specific details. To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation.

Overview of Distributed Energy Storage Systems

FIG. 1 is a conceptual illustration of multiple distributed energy storage systems 103 that are positioned at different electric load locations 104 and coupled to an electric grid 102, according to various embodiments of the present invention. The distributed energy storage systems 103 are installed either behind a utility's electric meter at electric load locations, such as commercial electric load locations, residential sites and/or commercial solar/wind production sites. The term commercial electric load location as used herein, generally includes a broad range of commercial and industrial electric users, such as hotels, office buildings, and restaurants, or installed on utility controlled sites including but not limited to substations, distribution or transmission lines, and capacitor banks. In general, each of the distributed energy storage systems 103 strategically stores energy in and releases energy from one or more energy storage devices located at the electric load location 104 to reduce the total cost of purchasing energy from the electric grid 102 for the electric load location 104.

The electric grid 102 will generally be connected to the electric load locations 104 and the power plants 102A that are adapted to deliver electric power to the electric grid 102. In general, an electric utility will help provide and/or deliver power to each of the electric load locations 104 in a region of the electric grid 102. In some cases, the tariff structure, such as electric rates and billing schedules, for different electric utilities may vary from region to region within the electric grid 102. The distributed energy storage systems 103, also referred to as advanced energy systems (AESs), are coupled to the electric grid 102. Consequently, the distributed energy storage systems 103 may be in communication with other distributed energy storage systems 103 distributed along the electric grid 102 and may be in communication with an operations center 109.

The operations center 109 may include software and hardware components that are configured to store, retrieve operation information from, and transmit operation information to each distributed energy storage system 103 to control the power fluctuations and power delivery at each respective electric load location 104. In some cases, the operation information may include environmental data, control information, device commands and other useful information. The distributed energy storage systems 103 in the different regions of the electric grid 102 are generally able to account for differences in power pricing (including energy tariffs and real-time energy pricing), differences in weather, differences in the health of the electric grid 102, and other external and internal electric power usage differences to provide an optimized and/or customized control of the power at each of the electric load locations 104. Embodiments of the invention use a control method employed in the distributed energy storage systems 103 located behind a utility's electric meter (not shown in FIG. 1) typically located at, but not limited to, medium and large commercial and industrial locations.

Figure 2:
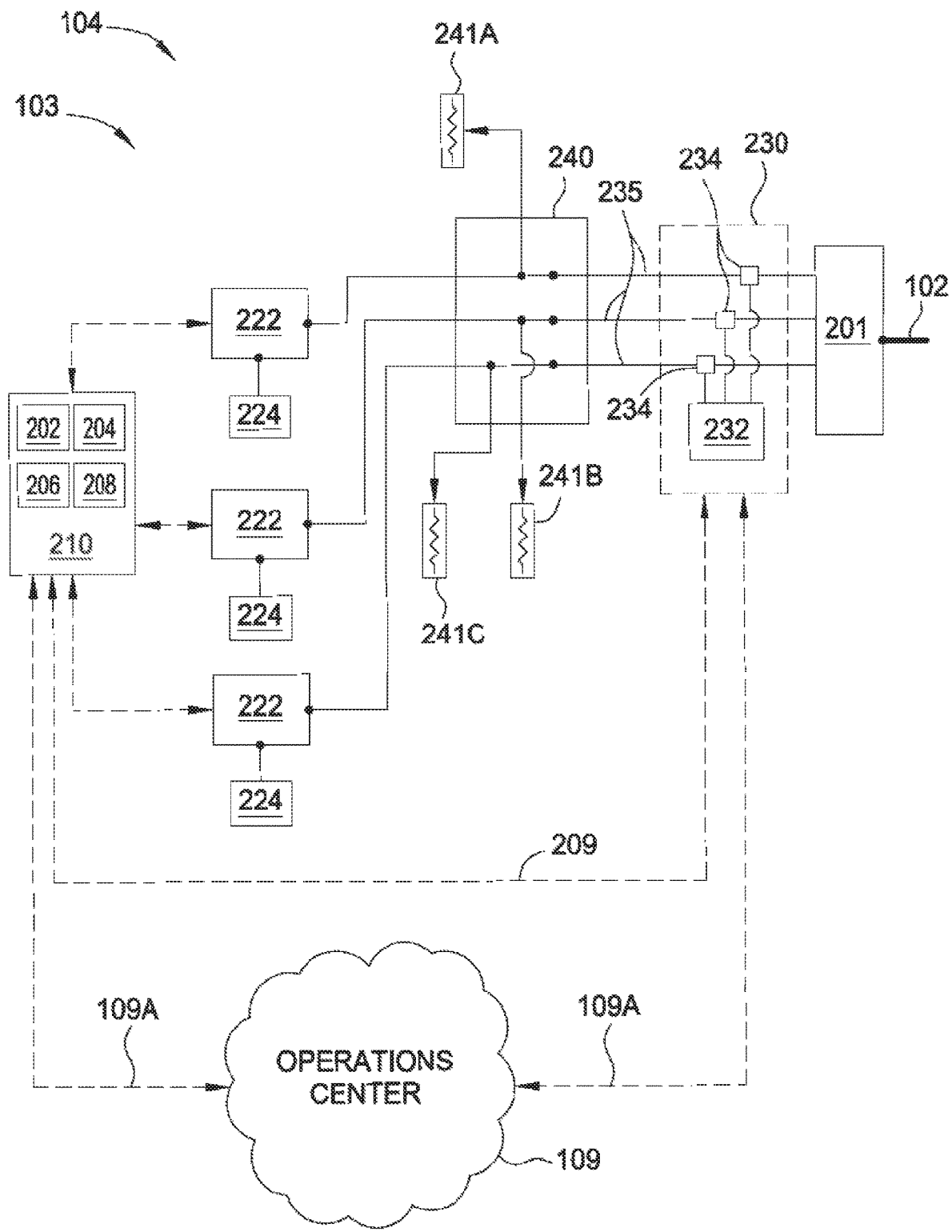
FIG. 2 is a schematic illustration of one of the distributed energy storage systems of FIG. 1, according to various embodiments of the present invention.

FIG. 2 is a schematic illustration of one of the distributed energy storage systems 103 of FIG. 1, according to various embodiments of the present invention. The distributed energy storage system 103 is disposed at the electric load location 104 and includes, without limitation, a power monitor 230, one or more power controllers 222, and a system controller 210. Each of the power controllers 222 is coupled to an energy storage device 224. The electric load location 104 typically contains an electric meter 201 that is coupled to the electric grid 102 and is used by the utility to track electricity usage at the electric load location 104. The electric meter 201 is configured to provide power to one or more electric loads 241 that are connected to a breaker panel 240. For example, the three electric loads 241A-241C are shown in FIG. 2.

In one example, the electric meter 201 is configured to distribute power to the electric loads 241A-241C along one or more phases that are each coupled to the breaker panel 240 along a conducting element 235. In general, an electric load can be any device that uses electrical energy at an electric load location 104, and may include, for example, heating, ventilation, air conditioning (HVAC) equipment, lighting, and other electronics units that receive power from the electric grid 102. Each of the electric loads 241A-241C may separately draw power through each of the conducting elements 235. The amount of power passing through the conducting element 235 is monitored by a sensor 234 disposed in the power monitor 230. The power monitor 230 will typically include one or more sensors 234 (e.g., voltage sensor and/or current sensor) that are configured to monitor and deliver a signal to a power monitor controller 232. The power monitor controller 232 is configured to process and deliver data relating to the time varying current (A), voltage (V) and/or power (W) delivered on the one or more phases to the system controller 210, and in some cases time varying current, voltage and/or power data to the operations center 109.

To control fluctuation in power and/or power level being drawn by each of the electric loads 241 in the electric load location 104, the distributed energy storage system 103 typically includes one or more power controllers 222. Each of the power controllers 222 is configured to control the delivery of power to the electric grid 102 or absorption of power received from the electric grid 102 by use of the energy storage device 224 that is connected to the power controller 222. In one embodiment, the power controllers 222 include one or more bidirectional power converters (not shown) that are capable of quickly converting stored DC energy found in the energy storage device 224 to the grid AC electricity and grid AC electricity back to DC energy that is stored in the energy storage device 224.

The distributed energy storage systems 103 can operate autonomously, but generally may be in frequent contact with a cloud-based optimization engine (not shown) that may be located in the operations center 109. The optimization engine can take in various data and develop optimal energy control solutions which are passed back down to one or more of the distributed energy storage systems 103. Each of the distributed energy storage systems 103 includes a system controller 210 that works together with the optimization engine to control the energy storage device 224 to implement energy control solutions within the distributed energy storage system 103. In many cases, the primary goal of the distributed energy storage system 103 is to determine and enforce "set-point(s)."

Each set-point specifies a desired upper limit for the power actually delivered to the electrical load location 104 from the electric grid 102. Each set-point is typically specified in kilowatts (kW). The system controller 210 may alter the set-point at different times of the day. In operation, the system controller 210 attempts to configure the energy storage device 224 to provide electrical energy to the electrical load location 104 at whatever rate that prevents the net load of the electrical load location 104 from exceeding the set-point. As referred to herein, the load is the time varying instantaneous power usage at the electrical load location 104. By contrast, the net load is a time varying quantity of electrical power that is actually delivered to the electrical load location 104 from the electric grid 102. Thus, at any point in time, the net load is equal to the load at the electrical load location 104 minus any power provided by the energy storage device 224.

In general, the system controller 210 controls the net load by discharging the energy stored in the energy storage device 224, such as devices that may include DC batteries, through the bidirectional energy converter during peak demand events. In some embodiments, the system controller 210 also manages the battery state-of-charge by recharging energy storage device 224 during periods of lower demand. The state-of-charge represents the amount of energy stored in the storage medium of energy storage device 224 (e.g., batteries), which can be converted to electrical energy at any time of day, for example during a peak demand event. The distributed energy storage system 103 is generally intelligent enough to ensure that there is adequate energy stored in the energy storage device 224 to be able to offset at least a portion of high-demand events.

Figure 3:
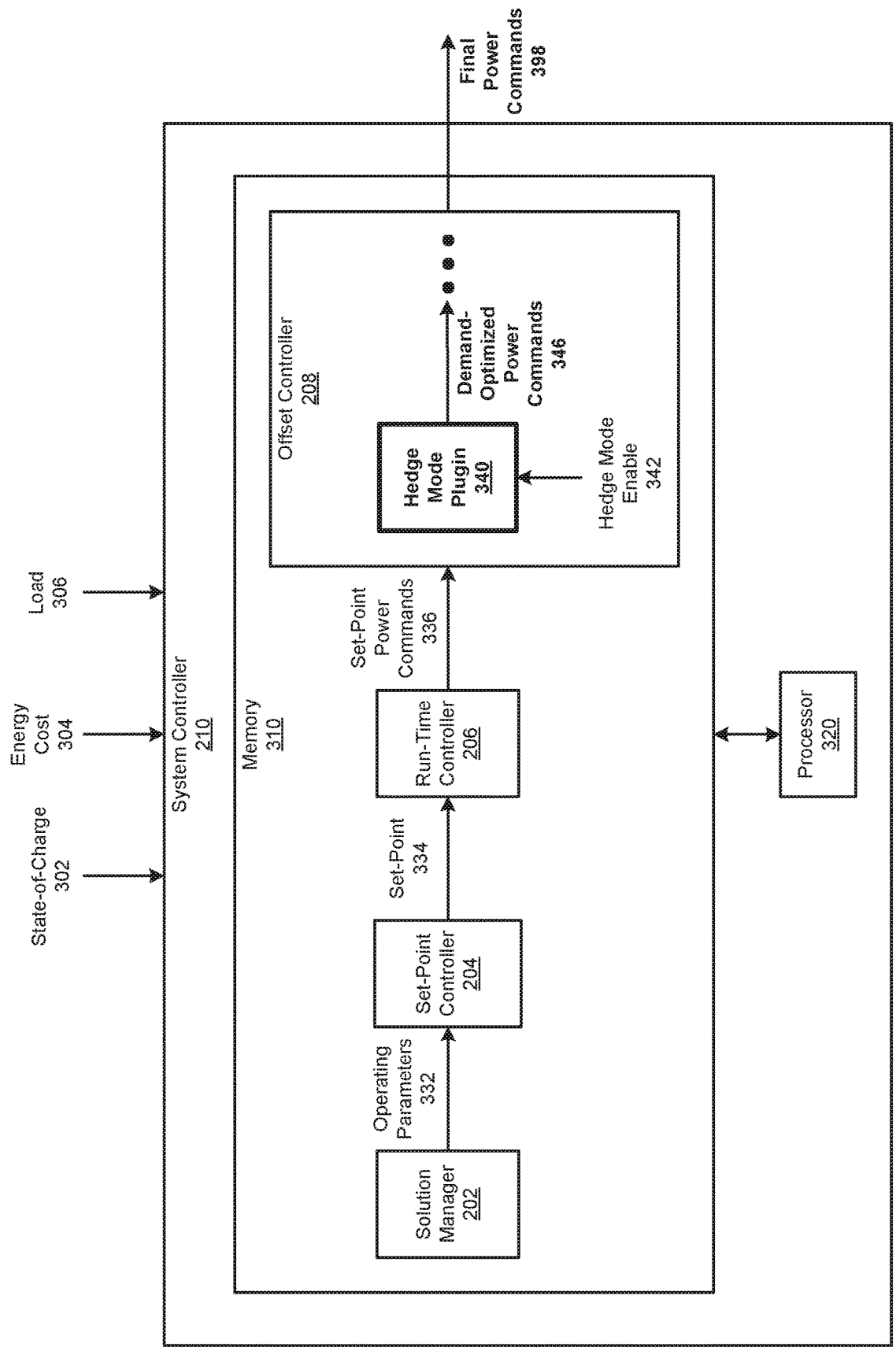
FIG. 3 is a more detailed illustration of the system controller of FIG. 2, according to various embodiments of the present invention.

In general, the system controller 210 controls various system functions and support hardware and monitors the processes being controlled by and within the distributed energy storage system 103. The system controller 210 includes a plurality of software based controlling elements that are adapted to synchronize and control the transfer of power between the conducting element 235 that is coupled to the electric grid 102. As shown, the software based controlling elements found in the system controller 210 include, without limitation, a solution manager 202, a set-point controller 204, a run-time controller 206, and an offset controller 208. The system controller 210 is configured to receive information from the power monitor 230 via a wired or wireless link 209 and from the operations center 109 via a wired or wireless link 109A. The system controller 210 is also configured to receive information from and deliver power commands to the power controllers 222 via a wired or wireless communication link 223A FIG. 3 is a more detailed illustration of the system controller 210 of FIG. 2, according to various embodiments of the present invention. As shown, the system controller 210 includes, without limitation, a processor 320 and a memory 310. In some embodiments, the system controller 210 may also include support circuits (or I/O) (not shown) such as cache, power supplies, clock circuits, input/output circuitry, subsystems, and the like. The processor 320 may be any instruction execution system, apparatus, or device capable of executing instructions. For example, the processor 320 could comprise a central processing unit (CPU), a controller, a microcontroller, a state machine, or any combination thereof.

The memory 310 stores content, such as software applications and data, for use by the processor 320. As shown, the memory 320 includes, without limitation, the solution manager 220, the set-point point controller 204, the run-time controller 206, and the offset controller 208. The memory 310 may be one or more of a readily available memory, such as random access memory (RAM), read only memory (ROM), floppy disk, hard disk, or any other form of digital storage, local or remote. In some embodiments, a storage (not shown) may supplement or replace the memory 310. The storage may include any number and type of external memories that are accessible to the processor 320. For example, and without limitation, the storage may include a Secure Digital Card, an external Flash memory, a portable compact disc read-only memory (CD-ROM), an optical storage device, a magnetic storage device, or any suitable combination of the foregoing.

In operation, the system controller 210 exchanges information with the power controller 222, the power monitor 230, and the operations center 109. In particular, the system controller 210 receives a state-of-charge 302, an energy cost 304, and a load 306. The solution manager 220, the set-point point controller 204, the run-time controller 206, and the offset controller 208 process the received information and generate final power commands 398. Finally, the offset controller 208 transmits the final power commands 398 to the power controllers 222.

The state-of-charge 302 represents the amount of energy stored in the storage medium of the energy storage device 224 (e.g., batteries), which can be converted to electrical energy at any time of day, for example during a peak demand event. The energy cost 304 may reflect the cost of purchasing energy from the electric grid 102 in an technically feasible fashion. For example, the energy cost 304 may specify a demand cost and/or consumption cost per kW assessed by the electrical company based on the time of day. The load 306 is the sum of the power levels drawn by the electric loads 241 in the electrical load location 104.

In alternate embodiments, the system controller 120 may receive any amount and type of additional data to determine the final power commands 398. For example, the system controller 120 may receive a load history associated with the electrical loads 241. Further, the system controller 120 may receive input information from any technically feasible source. For example, in some embodiments, the system controller 120 may receive input from the optimization engine (not shown) that specifies optimal energy control solutions involving one or more of the distributed energy storage systems 103.

The solution manager 202 exists on the local premise and is primarily responsible for developing optimal energy control solutions and transmitting operating parameters 332 to the set-point controller 204 and/or the offset controller 208. In one embodiment, the solution manager 202 receives demand threshold control instructions (e.g., demand set-point curves) and battery state-of-charge curves from the optimization engine and then determines at what time(s) of day the set-point controller 204 changes a set-point 334 that manages the net load at the electrical load location 104. For example, suppose that during a period of low demand charges (e.g., energy cost is low), the solution manager 202 receives new information that a high demand charge period (e.g., energy cost is high) is approaching. In such a scenario, the solution manager 202 sets the operating parameters 332 to reflect a new set-point 334 to which the set-point controller 204 should attempt to hold the net load at the electrical load location 104. The solution manager 202 then transmits the operating parameters 332 to the set-point controller 204.

The set-point controller 204 manages the set-point 334 for each instant in time based on the operating parameters 332 received from the solution manager 202. The set-points 334 attempt to ensure that the system maintains enough energy reserve in the energy storage device 224 to effectively manage the net load at the electric load location 104 over a particular time period, such as a day or part of a day. The run-time controller 206 receives the set-points 334 and generates set-point power commands 336 that control the charge or discharge of energy to or from the energy storage device 224 via the bi-directional power converter.

More specifically, for a particular time, the run-time controller 206 receives the set-point 334, the load 306, and other gating parameters (such as time of day) and computes the set-point power command 336. For example, in some embodiments, the run-time controller 336 subtracts the load 306 from the set-point 334 to determine a power value that the run-time controller 336 specifies in the set-point power command 336. If the power value is positive, then the set-point power command 336 configures the energy storage device 224 to charge (i.e., store energy). By contrast, if the power value is negative, then the set-point power command 336 configures the energy storage device 224 to discharge (i.e., release energy). In general, the set-point power commands 338 are designed to configure the energy storage device 224 to maintain the net load at the electrical load location 104 at or below the set-point 334.

The offset controller 208 is used as a higher-level system override of the control provided by the system controller 210. The offset controller 208 is configured to selectively modify the charge or discharge power command 338 to produce a final power command 398 that the offset controller 208 transmits to the power controller 222. More specifically, the offset controller 208 receives the power command 338 and executes one or more plugins that each generates an optimized power command. The offset controller 208 manages the various plugins, determines which of the plugins is active at any instance in time, and generates the final power commands 398 based on the optimized power commands. In some embodiments, the offset controller 208 includes an enable and a priority setting for each of the plugins. In such embodiments, the offset controller 208 selects one of the plugins based on the enables and the priority settings and then sets the final power command 398 to the optimized power command generated by the selected plugin.

To ensure that the plugins do not perturb the algorithms implemented in the set-point controller 204 and the optimization engine, the offset controller 208 is also configured to modify the telemetry information. An example of such telemetry information is the data received from the power monitors 230. For example, suppose that the offset controller 208 receives the set-point power command 336 that specifies a discharge of 100 kW from the energy storage device 224. However, suppose that the offset controller 208 generates a corresponding final power command 398 that specifies a discharge of 150 kW of from the energy storage device 224. In such a scenario, the offset controller 208 would add 50 kW of power back to the telemetry information received from the power monitors 230 so that the set-point controller 204 and the optimization engine would not see a deviation from the predicted load.

The plugins included in the offset controller 208 may target any number and type of situations that may not be handled optimally by the set-point power commands 336. One such situation is optimizing demand charges in the presence of power limited events. To determine the demand charge, a utility company tracks the average kilowatt (kW) load at the electrical load location 104 measured within a time interval referred to herein as a "utility measure interval" (UMI). The utility company then sets the demand charge for the electrical load location 104 based on the highest average kW demand of all the UMIs included in a billing cycle. As is well-known, such demand charges can lead to significantly higher electricity costs for the electrical load location 104. For example, for a typical commercial or industrial electrical load location 104, the demand charge may be between 30 and 70 percent of the total cost of electricity purchased from the utility company during the billing cycle.

A power limited event occurs when the load 306 at the electrical load location 104 exceeds the capability of the energy storage device(s) 224 to prevent the net load from exceeding the set-point during a given UMI. For example, if the power rating (i.e., maximum capacity) of the energy storage device 224 is 100 kW, the set-point 334 is 50 kW, and the load 306 is 200 kW, then a power limited event occurs. Throughout the UMI, the set-point power commands 336 attempt to maintain the net load of the electrical load location 204 below the set-point 334. In particular, during the power limited event, the run-time controller 306 typically generates the set-point power commands 336 that discharge the energy storage device 224 at the maximum power rating. However, during the remainder of the UMI, the set-point power commands 336 may not configure the energy storage device 224 to discharge at the maximum power rating. If the energy storage device 224 does not discharge at the maximum power rating for the entire UMI, then the average net load at the electrical load location 204 associated with the UMI is unnecessarily high. Consequently, the electrical energy cost for the electrical load location 204 may be unacceptable high.

Reducing Demand Charges

To reduce the demand charges for the electrical load location 104, the offset controller 208 includes a hedge mode plugin 340. As shown, the hedge mode plugin 340 is activated via a hedge mode enable 342, receives the set-point power commands 336 from the run-time controller 206, and generates demand optimized power commands 346. If the hedge mode enable 342 is active and the priority associated with the hedge mode plugin 340 is higher than the priorities associated with any other plugins, then the offset controller 280 sets the final power commands 398 equal to the demand-optimized power commands 346. In alternate embodiments, the hedge mode plugin 340 may receive any commands from any sources instead of receiving the set-point power commands 336 from the run-time controller 206.

Figure 4:
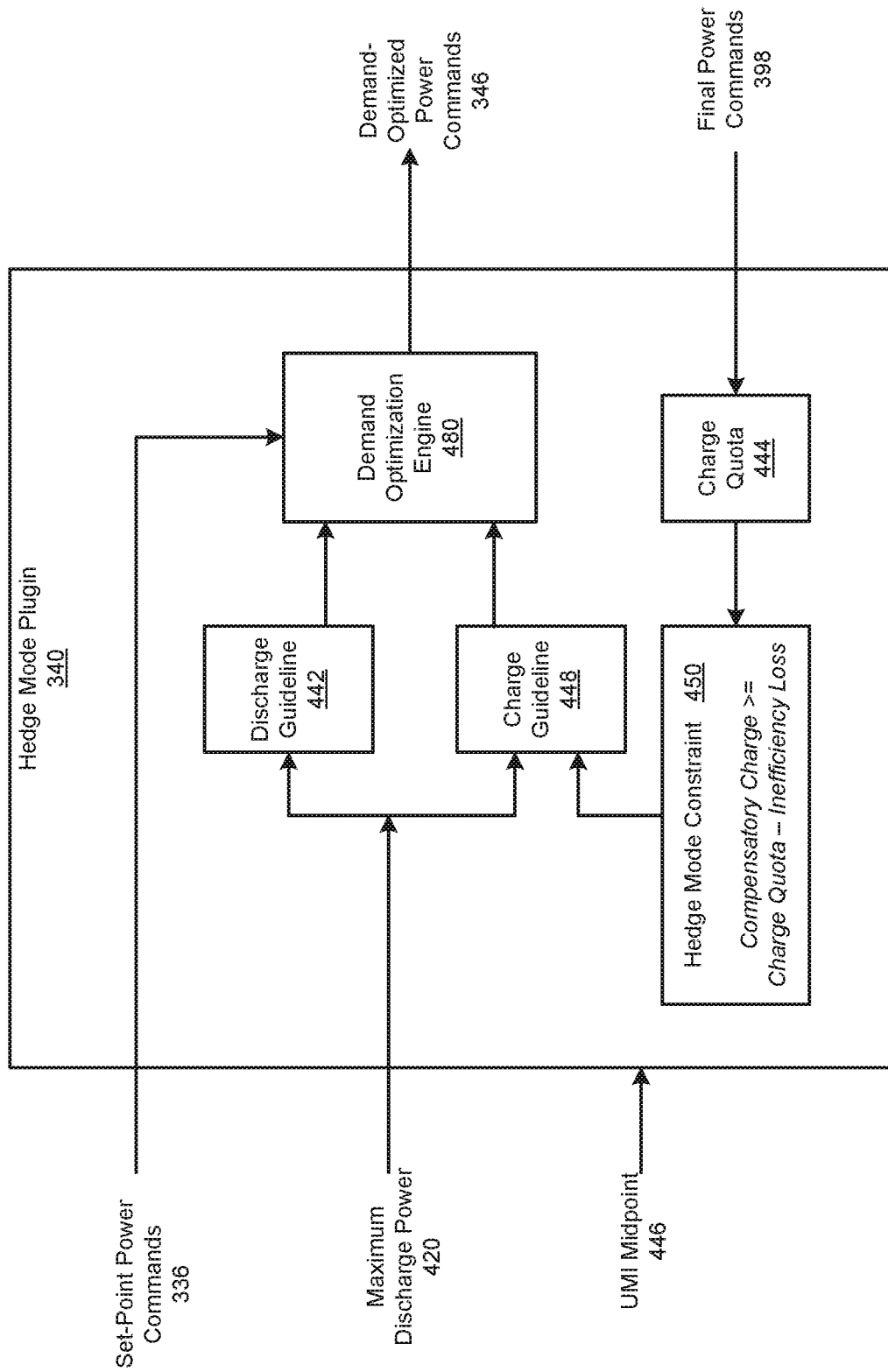
FIG. 4 is a more detailed illustration of the hedge mode plugin of FIG. 3, according to various embodiments of the present invention.

FIG. 4 is a more detailed illustration of the hedge mode plugin 340 of FIG. 3, according to various embodiments of the present invention. As shown, the hedge mode plugin 340 includes, without limitation, a discharge guideline 442, a charge quota 444, a hedge mode constraint 450, a charge guideline 448, and a demand optimization engine 480. As also shown, the hedge mode plugin 340 receives the set-point power commands 336, a utility measurement interval (UMI) midpoint 446, and a maximum discharge power 420. The hedge mode plugin 340 generates the demand-optimized power commands 346.

For explanatory purposes only, the set-point power commands 336, the demand-optimized power commands 346, and the final power commands 346 may be referred to herein as "power commands." Each power command specifies a power value and is associated with a specific time. If the power command specifies a power value that is negative, then the power command configures the energy storage device 224 to discharge power. Such a power command is also referred to herein as a "discharge power command" and the associated power value is also referred to herein as a "discharge value." By contrast, if a power command specifies a power value that is positive, then the power command configures the energy storage device 224 to store power. Such a power command is also referred to herein as a "charge power command" and the associated power value is also referred to herein as a "charge value." The time that is associated with the power command is the time at which the energy storage device 224 is configured to execute the power command.

To increase the ability of the energy storage device 224 to reduce the average demand associated with each UMI, the hedge mode plugin 340 computes an opportunistic behavior that varies across the UMI. The demand optimization engine 480 determines whether to override each of the set-point power commands 336 based on this opportunistic behavior. The opportunistic behavior implements a two phase approach to managing the energy storage device 224 during each UMI. The two phases include a preemptive pre-discharge phase and a subsequent compensatory charge phase.

The opportunistic behavior of the hedge mode plugin 340 during the pre-discharge phase is to preemptively discharge the energy storage device 224. Accordingly, during the pre-discharge phase, the opportunistic behavior of the hedge mode plugin 340 reduces the net load of the electrical load location 104 and reduces the average demand charge associated with the UMI. During the compensatory charge phase, the opportunistic behavior of the hedge mode plugin 340 is to recharge the energy storage device 224. More specifically, the hedge mode plugin 340 charges the energy storage device 224 to maintain a net balance charge of zero (including any inefficiency loss) within the UMI. To ensure that the hedge mode plugin 340 maintains a net balance charge of zero within the UMI, the hedge mode plugin 340 includes the charge quota 444 and the hedge mode constraint 450. During the pre-discharge phase, the hedge mode plugin 340 tracks the magnitude of the energy discharged via the charge quota 444. After the pre-discharge phase, the hedge mode plugin configures the opportunistic behavior during the compensatory charge phase based on the hedge mode constraint 450.

As shown, the hedge mode constraint 450 constrains the amount of energy that is stored in the energy storage device 224 during the compensatory charge phase to be equal or greater than the sum of the charge quota 444 and any inefficiency loss associated with the energy storage device 224. In this fashion, the opportunistic behavior of the hedge mode plugin 340 maintains a consistent state-of-charge 302 for the energy storage device 224 at the beginning of each UMI. Consequently, the opportunistic behavior of the hedge mode plugin 340 ensures the ability of the energy storage device 224 to reduce demand costs associated with multiple UMIs.

In alternate embodiments, the hedge mode constraint 450 may be computed in a different manner. For example, in some embodiments, the inefficiency loss is expressed as a percentage. In such embodiments, the hedge mode constraint 450 could constrain the amount of energy that is stored in the energy storage device 224 during the compensatory charge phase to be equal to or greater than the sum of the charge quota 444 divided by the inefficiency loss percentage.

In operation, the hedge mode plugin 340 receives the utility measurement interval (UMI) midpoint 446 and the maximum discharge power 420. The UMI midpoint 446 bisects the UMI with respect to time into a first half that is the pre-discharge phase and a second half that is the subsequent compensatory charge phase. In alternate embodiments, the UMI midpoint 446 may be defined in any technically feasible fashion based on a UMI time duration (not shown in FIG. 4) that is defined by the utility company associated with the electric grid 102.

The maximum discharge power 420 may be received from any element included the system controller 210 and specifies the amount of power that is allocated to the hedge mode plugin 340 for increasing demand reduction effectiveness. The maximum discharge power 420 may be determined based on any number of system characteristics and/or any number of optimization criteria in any technically feasible fashion. For example, in some embodiments, the solution manager 202 computes the maximum discharge power 420 based on the state-of-charge 302 of the energy storage device 224 and a time-dependent consumption cost. In other embodiments, the solution manager 202 may set the maximum discharge power 420 to a relatively low value to reduce the overall lifetime c-rate associated with the energy storage system 224. The c-rate measures the rate at which the energy storage system 224 may discharge relative to the maximum capacity of the energy storage system 224.

At the beginning of the pre-discharge phase, the hedge mode plugin 340 computes the discharge guideline 442 that defines the opportunistic behavior of the hedge mode plugin 340 during the pre-discharge phase. The discharge guideline 442 includes a set of negative power values (i.e., discharge values) that are indexed by "time ticks" included in the pre-discharge phase. As referred to herein, a time tick is a unit of time that is used by the hedge mode plugin 340 to discretize time. For each time tick, the time is specified relative to the beginning of the pre-discharge phase. For instance, if the duration between time ticks is 1 second, then the time associated with the first time tick in the pre-discharge phase is 1 second, the time associated with the second time tick in the pre-discharge phase is 2 seconds, and so forth.

The hedge mode plugin 340 computes the negative power values included in the discharge guideline 442 based on a discharge curve and the time ticks. The discharge curve may be any function of time that defines negative power values that are consistent with preemptively discharging the energy storage device 224. Some examples of discharge curves are a "box" function, a linear function, and a spline curve (e.g., a Bezier curve) function. In some embodiments, the hedge mode plugin 340 parameterizes the discharge curve based on the duration of the pre-discharge phase, the maximum discharge power 420 and/or any other technically feasible parameters.

For example, in some embodiments, the hedge mode plugin 320 parameterizes a box function to specify negative power values that are equal to the maximum discharge power 420 for a time interval that is limited by the hedge mode constraint 450. Note that the inefficiency loss is typically greater than zero and the maximum charge power typically equals the magnitude of the maximum discharge power 420. Consequently, complying with the hedge mode constraint 450 restricts the time interval of the "box" specified by box function to be shorter than the duration of the pre-discharge phase.

Each parameterized discharge curve may represent a different level of aggressiveness with respect to preemptively discharging the energy storage device 224. For example, a parameterized discharge curve that specifies the maximum discharge power 420 for the majority of the pre-discharge phase is relatively aggressive. By contrast, a parameterized discharge curve based on a linear function that specifies the maximum discharge power 420 at the time tick zero and then negative power values that linearly decrease in magnitude throughout the pre-discharge phase is less aggressive.

For each time tick included in the pre-discharge phase, the hedge mode plugin 340 computes the power value included in the discharge guideline 442 based on the parameterized discharge curve. After pre-computing the discharge guideline 442 and prior to the pre-discharge phase, the hedge mode plugin 340 initializes the charge quota 444 to zero. At any given time, the charge quota 444 represents the total energy discharged from the energy storage device 224 based on the final power commands 398 generated by the offset controller 208 during the pre-discharge phase.

Subsequently, during the pre-discharge phase, the demand optimization engine 480 receives the set-point power command 336 and determines whether to override the set-point power command 336. If the set-point power command 336 is a charge command, then the demand optimization engine 480 overrides the set-point power command 336. If the set-point power command 336 is a discharge command, then the demand optimization engine 480 compares the power value specified by the set-point power command 336 to the power value included in the discharge guideline 442 and associated with the current time tick.

If the magnitude (i.e., absolute value) of the power value specified by the set-point power command 336 is less than the magnitude of the power value included in the discharge guideline 442 and associated with the current time tick, then the demand optimization engine 480 overrides the set-point power command 336. To override the set-point power command 336, the demand optimization engine 480 generates the demand-optimized power command 346 that specifies the power value included in the discharge guideline 442 and associated with the current time tick. However, if the magnitude of the power value specified by the set-point power command 336 is greater than or equal to the magnitude of the power value included in the discharge guideline 442 and associated with the current time tick, then the demand optimization engine 480 does not override the set-point power command 336. Instead, the demand optimization engine 480 sets the demand-optimized power command 346 equal to the set-point power command 336. In this fashion, the demand optimization engine 480 prioritizes the set-point power command 336 during times of relatively high demand.

After the demand optimization engine 480 produces the demand-optimized power command 346, the offset controller 208 generates the final power command 398. The offset controller 208 may generate the final power command 398 in any technically feasible fashion based on any number of priorities and enabled plugins. The hedge mode plugin 340 then adds the magnitude of the energy discharged from the energy storage device 224 during the time tick to the charge quota 444. The hedge mode plugin 340 computes the energy discharged during the time tick based on the final power command 398 generated by the offset controller 208. The demand optimization engine 480 continues to produce the demand-optimized power commands 338 based on the discharge guideline 442 and the hedge mode plugin 340 continues to update the charge quota 444 until the time reaches the UMI midpoint 446.

Upon reaching the UMI midpoint 446 and before beginning the compensatory charge phase, the hedge mode plugin 340 computes the charge guideline 448 based on the hedge mode constraint 450. The charge guideline 448 includes a positive power value for each of the time ticks included in the compensatory charge interval. The hedge mode plugin 340 may implement any type of charge guideline 448 in any technically feasible fashion that is consistent with the hedge mode constraint 450. In some embodiments, the hedge mode plugin 340 parameterizes a charge curve based on one or more parameters and then computes the power values for the charge guideline 448 based on the resulting parameterized curve.

For example, in some embodiments, the hedge mode plugin 340 parameterizes a Bezier curve function based on the hedge mode constraint 450. In such embodiments, the hedge mode plugin 340 initially sets a curvature vector to a first set of values that specify a relatively unaggressive curve to generate a potential charge curve. The hedge mode plugin 340 then integrates the potential charge curve over the time duration of the compensatory charge phase (e.g., half the UMI time duration). The result of this integration is an amount of energy that, if the hedge mode plugin 340 were to implement the potential charge curve, would be stored in the energy storage device 224.

If the compensatory energy is greater than or equal to the sum of the charge quota 444 and the total inefficiency loss over the UMI, then the hedge mode plugin 340 sets the charge guideline 444 equal to the potential charge curve. If the compensatory energy is less than the sum of the charge quota 444 and the total inefficiency loss over the UMI 444, then the hedge mode plugin sets the curvature vector to another set of values that specifies a more aggressive curve to generate a new potential charge curve. The hedge mode plugin 340 repeats the process of increasing the aggressiveness of the potential charge curve until the compensatory energy is greater than or equal to the sum of the charge quota 444 and the inefficiency loss. The hedge mode plugin 340 then sets the parameterized charge curve equal to this potential charge curve.

For each time tick associated with the charge guideline 448, the hedge mode plugin 340 computes the guideline power value based on the parameterized charge curve and the time tick. If the hedge mode plugin 340 is unable to compute a parameterized charge curve that complies with the hedge mode constraint 450, then the hedge mode plugin 340 may implement any type of default behavior. For example, the hedge mode plugin 340 may set each of the power values included in the charge guideline 448 equal to the magnitude of the maximum discharge power 420.

Subsequently, during the compensatory charge phase, the demand optimization engine 480 receives the set-point power command 336 and determines whether to override the set-point power command 336. The demand optimization engine 480 compares the power value specified by the set-point power command 336 to the power value included in the charge guideline 448 and associated with the current time tick. If the power value specified by the set-point power command 336 is greater than the power value included in the charge guideline 448 and associated with the current time tick, then the demand optimization engine 480 overrides the set-point power command 336. More precisely, the demand optimization engine 480 generates the demand-optimized power command 346 that specifies the power value included in the charge guideline 444 and associated with the current time tick.

If, however, the power value specified by the set-point power command 336 is less than or equal to the power value included in the charge guideline 448 and associated with the current time tick, then the demand optimization engine 480 does not override the set-point power command 336. Instead, the demand optimization engine 480 sets the demand-optimized power command 346 equal to the set-point power command 336. Notably, because discharge commands specify negative power values, if the set-point power command 336 is a discharge command, then the demand optimization engine 480 priorities the set-point power command 336. In this fashion, the demand optimization engine 480 priorities the set-point power command 336 over the opportunistic behavior of the hedge mode plugin 340 during times of relatively high load 306, such as power limited events.

After the demand optimization engine 480 produces the demand-optimized power command 346, the offset controller 208 generates the final power command 398. The offset controller 208 may generate the final power command 398 in any technically feasible fashion based on any number of priorities and enabled plugins. The demand optimization engine 480 continues to produce the demand-optimized power commands 346 based on the charge guideline 448 for the remainder of the UMI.

As persons skilled in the art will recognize, there is a potential for a net loss of the balance of energy stored in the energy storage device 224 during each UMI. For example, if a power limited event occurs during the compensatory charge phase, then the amount of energy that is discharged from the energy storage device 224 during the pre-discharge phase may exceed the amount of energy that is stored in the energy storage device 224 during the compensatory charge phase. In various embodiments, the hedge mode plugin 340, the demand optimization engine 480, the offset controller 208, and/or the system controller 210 may implement any number of and type of algorithms to adapt to such circumstances. For example, the hedge mode plugin 340 may be configured to specify an opportunistic behavior that results in an increase in the balance of energy stored in the energy storage device 224 for one or more UMIs following a power limited event.

In various embodiments, the offset controller 208 may activate and deactivate the hedge mode plugin 340 via the hedge mode enable 342 at any point in time (including during a UMI) and based on any criteria. For example, in some embodiments, the offset controller 208 may enforce state-of-charge band limitations for the operation of the energy storage device 224. If the state-of-charge 302 of the energy storage device 224 does not lie within a predetermined range, then the offset controller 208 may deactivate the hedge mode plugin 340 during the pre-discharge phase, the compensatory charge phase, or the entire UMI.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. For example, in some embodiments, the hedge mode plugin 340 may compute the power value at each time tick instead of pre-computing the discharge guideline 442 and/or the charge guideline 444. In other embodiments, the system controller 210 may not include the offset controller 208. In such embodiments, the system controller 210 may implement a pre-discharge phase and a compensatory charge phase and generate the final power commands 398 in any technically feasible fashion. As a general matter, various embodiments include any techniques and/or systems for controlling an average demand based on preemptively pre-discharging an energy storage device and subsequently recharging the energy storage device.

Figure 5A:
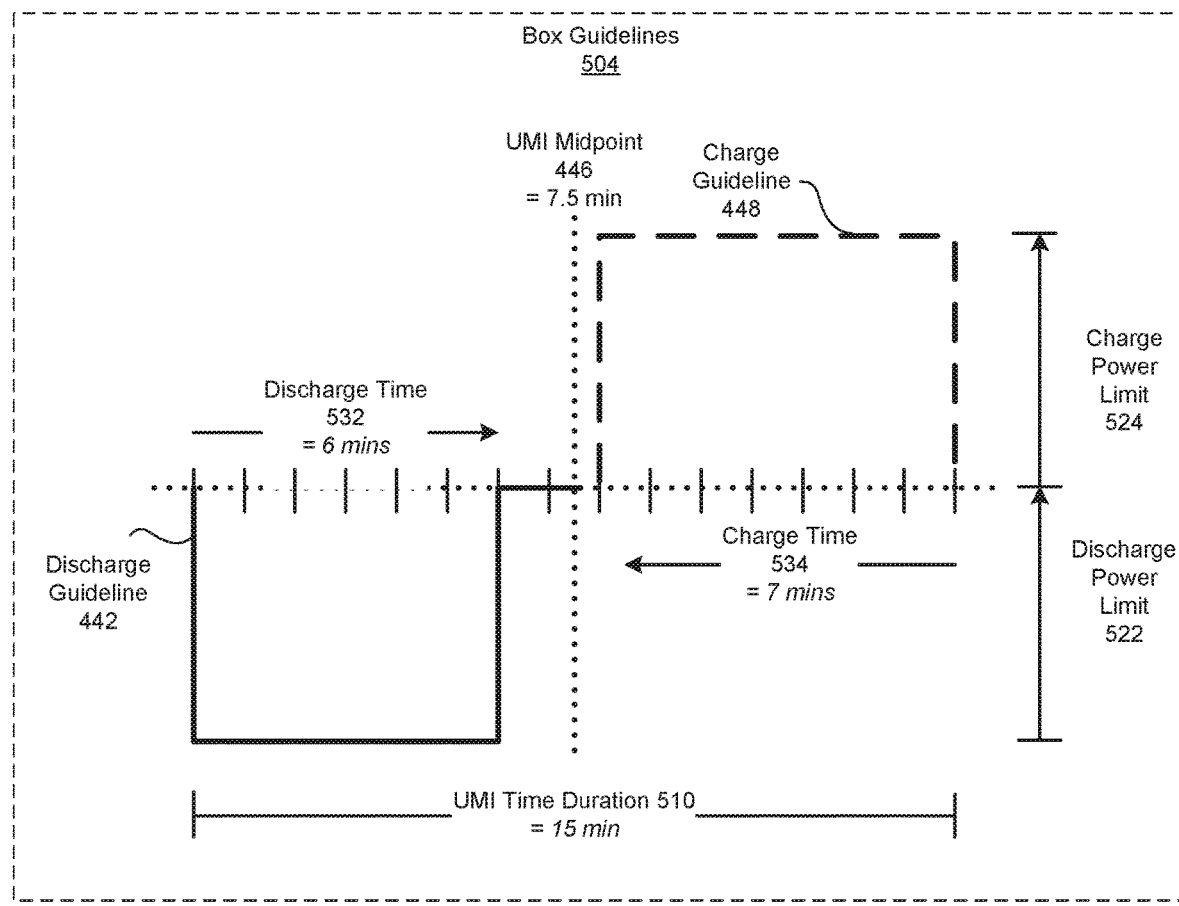
FIG. 5A illustrates discharge and charge guidelines that the hedge mode plugin of FIG. 4 may be configured to implement, according to various embodiments of the present invention.

FIG. 5A illustrates the discharge guidelines 442 and the charge guidelines 448 that the hedge mode plugin 320 of FIG. 4 may be configured to implement, according to various embodiments of the present invention. As shown, "box" guidelines 504 include, without limitation, the discharge guideline 442 and the charge guideline 448. For explanatory purposes, a UMI time duration 510 is 15 minutes and the UMI midpoint 446 is 7.5 minutes. Consequently the pre-discharge phase spans from 0 minutes to 7.5 minutes and the compensatory charge phase spans from 7.5 minutes to 15 minutes.

To compute the discharge guideline 442, the hedge mode plugin 320 parameterizes a discharge "box" function via a constant discharge limit 522 and a discharge time 532. The box function is zero at all times except during a "box" time interval where the box function equals a constant value. The hedge mode plugin 320 sets the discharge power limit 522 equal to maximum discharge power 420. To enable the hedge mode plugin 320 to effectively compensate for the inefficiency loss associated with the energy storage device 422, the hedge mode plugin 320 sets the discharge time 532 equal to the length of the pre-discharge phase (7 minutes) minus a 1 minute "buffer." As shown, the resulting discharge guideline 442 specifies the maximum discharge power 420 for 6 minutes and then zero for the remaining minute of the pre-discharge phase.

To compute the charge guideline 448, the hedge mode plugin 320 computes the charge quota 444 based on the area of the "box" included in the discharge guideline 442. The hedge mode plugin 320 then parameterizes a charge box function via a charge power limit 524 and a charge time 534. The hedge mode plugin 320 sets the charge power limit 524 to the magnitude of the maximum discharge power 420. The hedge mode plugin 320 then computes the charge time 534 based on the hedge mode constraint 450. Because of the inefficiency loss associated with the energy storage device, the hedge mode plugin 320 ensures that the area of the box included in the charge guideline 448 is greater than the area of the box included in the discharge guideline 442. As shown, the hedge mode plugin 320 sets the charge time 534 to 7 minutes. The resulting charge guideline 448 specifies zero for the first 0.5 minutes of the charge phase and then the magnitude of the maximum discharge power 420 for the next 6.5 minutes.

Figure 5B:
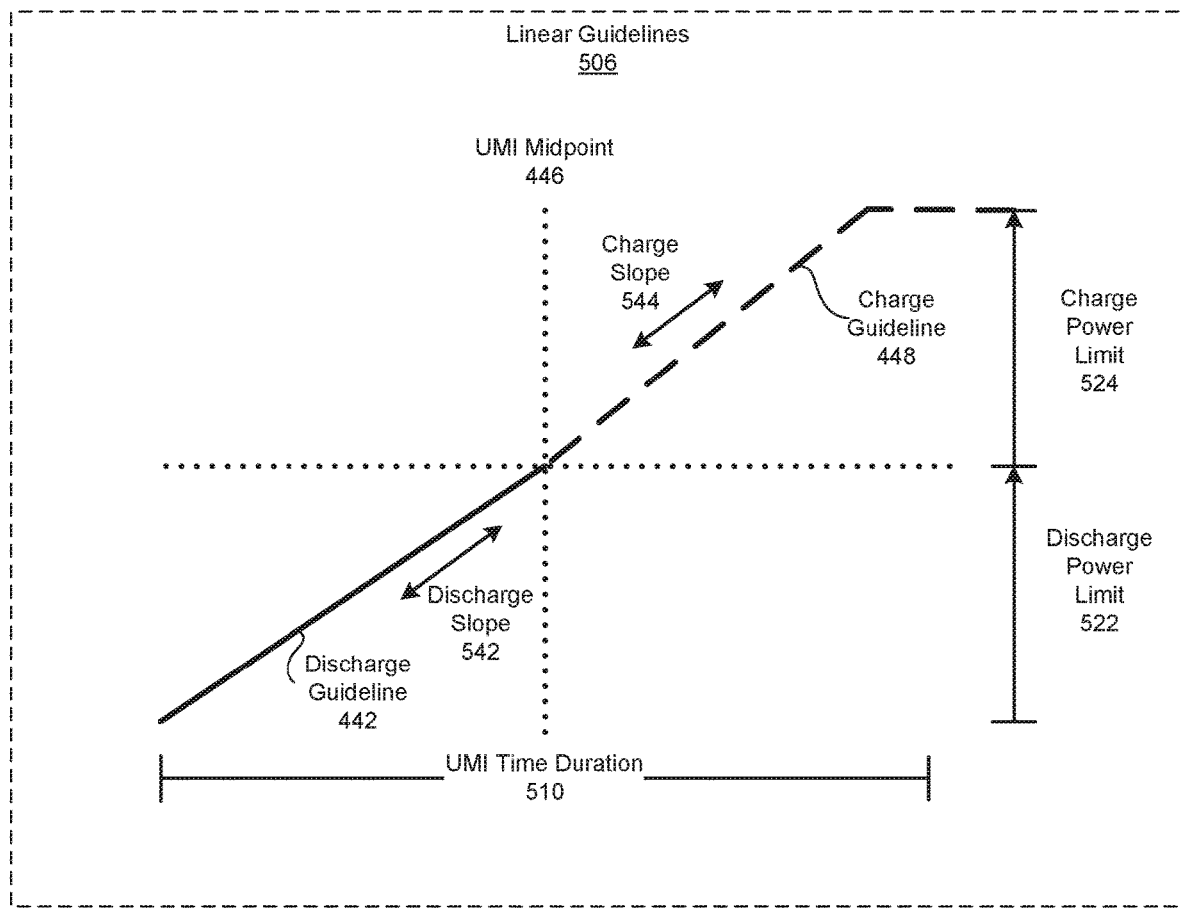
FIG. 5B illustrates discharge and charge guidelines that the hedge mode plugin of FIG. 4 may be configured to implement, according to other various embodiments of the present invention.

FIG. 5B illustrates the discharge guidelines 442 and the charge guidelines 448 that the hedge mode plugin 320 of FIG. 4 may be configured to implement, according to other various embodiments of the present invention. As shown, linear guidelines 506 include, without limitation, the discharge guideline 442 and the charge guideline 448. For explanatory purposes, the UMI time duration 510 is 15 minutes and the UMI midpoint 446 is 7.5 minutes. Consequently the pre-discharge phase spans from 0 minutes to 7.5 minutes and the compensatory charge phase spans from 7.5 minutes to 15 minutes.

To compute the discharge guideline 442, the hedge mode plugin 320 parameterizes a discharge linear function via the discharge power limit 522 and a discharge slope 542. The hedge mode plugin 320 sets the discharge power limit 522 equal to the maximum discharge power 420. The hedge mode plugin 320 sets the discharge slope 542 in any technically feasible fashion. For example, the hedge mode plugin 320 may set the discharge slope 542 to a predetermined value. As shown, the resulting discharge guideline 442 specifies the maximum discharge power 420 at the beginning of the pre-discharge phase (0 minutes). Throughout the remainder of the pre-discharge phase, the magnitude of the discharge guideline 442 decreases linearly based on the discharge slope 542. At the end of the pre-discharge phase, the discharge guideline 422 equals zero.

To compute the charge guideline 448, the hedge mode plugin 320 computes the charge quota 444 based on the area specified by the discharge guideline 442. The hedge mode plugin 320 then parameterizes a charge linear function via the charge power limit 524 and a charge slope 544. The hedge mode plugin 320 sets the charge power limit 524 to the magnitude of the maximum discharge power 420. The hedge mode plugin 320 then computes the charge slope 544 based on the hedge mode constraint 450. Because of the inefficiency loss associated with the energy storage device, the hedge mode plugin determines that charge slope 544 is greater than the discharge slope 542. As shown, the resulting charge guideline 448 is zero at the beginning of the compensatory charge phase (7.5 minutes) and increases linearly until the power value reaches the charge power limit 524. For the remainder of the compensatory power phase, the charge guideline 422 equals the charge power limit 524.

Figure 5C:
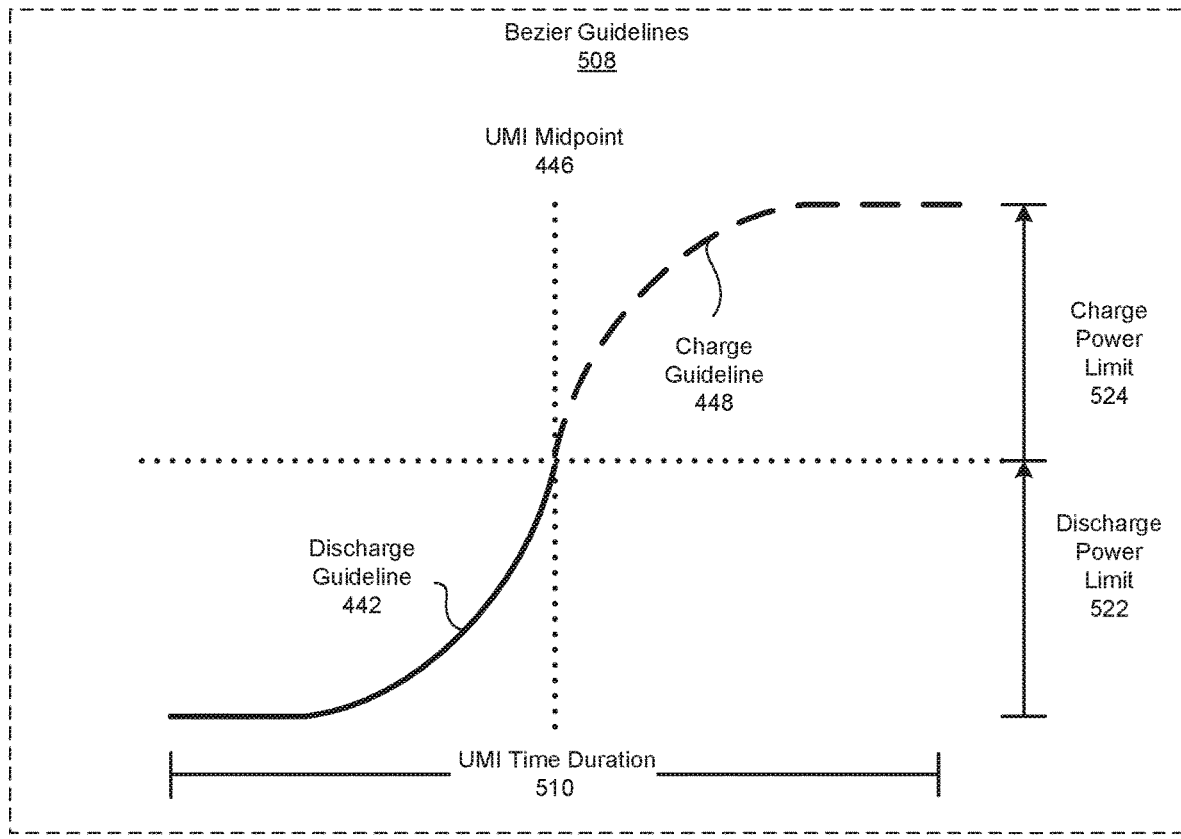
FIG. 5C illustrates discharge and charge guidelines that the hedge mode plugin of FIG. 4 may be configured to implement, according to yet other various embodiments of the present invention.
Figure 5C:
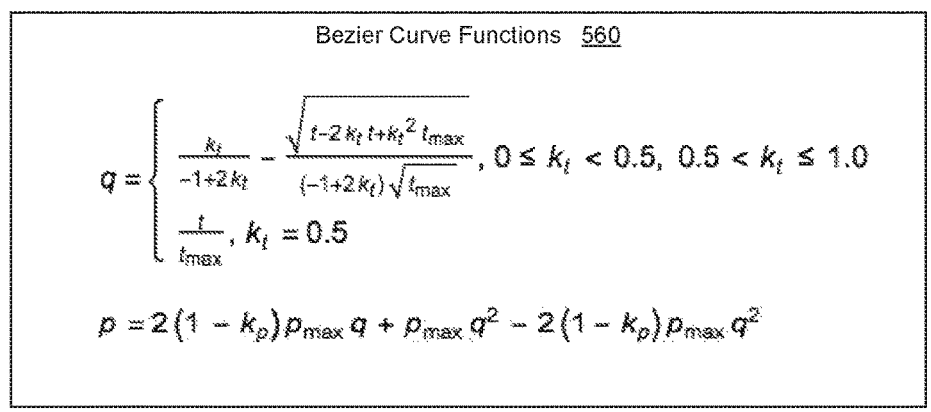

FIG. 5C illustrates the discharge guidelines 442 and the charge guidelines 448 that the hedge mode plugin 320 of FIG. 4 may be configured to implement, according to yet other various embodiments of the present invention. As shown, Bezier guideline 508 include, without limitation, the discharge guideline 442 and the charge guideline 448. The hedge mode plugin 320 computes the Bezier guidelines 508 based on Bezier curve functions 560:

$$q = \begin{cases} \dfrac{k_t}{-1 + 2k_t} - \dfrac{\sqrt{t - 2k_t t + k_t^2 t_{max}}}{(-1 + 2k_t)\sqrt{t_{max}}}, & 0 \le k_t < 0.5,\ 0.5 < k_t \le 1.0 \\ \dfrac{t}{t_{max}}, & k_t = 0.5 \end{cases} \quad (1)$$

$$p = 2(1 - k_p)p_{max}q + p_{max}q^2 - 2(1 - k_p)p_{max}q^2 \quad (2)$$

Where the parameters include:
$k_t$ a curvature in time that is a first component of a curvature vector
$t_{max}$ half of the UMI time duration 510
t a dependent variable in time
$k_p$ a curvature in power that is a second component of the curvature vector
$p_{max}$ the maximum discharge power 420

The hedge mode plugin 320 computes the discharge guideline 442 and the charge guideline 448 based on the Bezier curve functions 550 and composites the two guidelines into a smooth curve. First, the hedge mode plugin 320 parameterizes the Bezier curve function 550 based on a predetermined curvature vector, the duration of the pre-discharge phase, and the maximum discharge power 420 to generate the discharge guideline 442.

After the pre-charge phase is complete, the hedge mode plugin 320 iteratively parameterizes the Bezier curve functions 550 to generate the charge guideline 448. More specifically, the hedge mode plugin 320 parameterizes the Bezier curve functions 550 based on fixed parameters and variable parameters. The fixed parameters include the time duration of the compensatory charge phase and the maximum discharge power 420. The variable parameters include components of the curvature vector.

As described previously herein, the hedge mode plugin 320 iteratively parameterizes the Bezier curve functions 550 to generate potential charge curves that correspond to increasingly aggressive values for the components of the curvature vector. When the hedge mode plugin 320 determines that the potential charge curve satisfies the hedge mode constraint 450, the hedge mode plugin 320 selects the potential charge curve as the final parameterized curve. The hedge mode plugin 320 then reflects the final parameterized curve in time and power about the point 0.0 and offsets the final parameterized curve by the duration of the compensatory charge phase to generate the charge guideline 448. As shown, the discharge guideline 442 and the charge guideline 448 are asymmetric, allowing the hedge mode plugin 320 to fully compensate for any inefficiency loss associated with the energy storage device 224.

Figure 6:
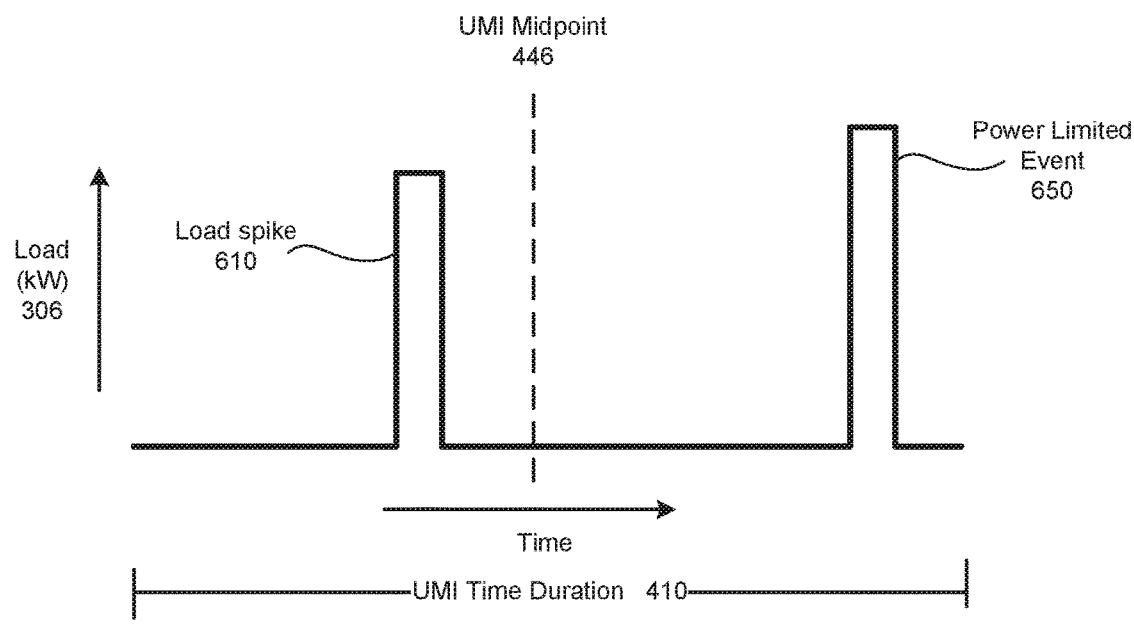
FIG. 6 illustrates an example of the optimized discharge and charge commands that the hedge mode plugin of FIG. 4 may be configured to generate, according to various embodiments of the present invention.
Figure 6:
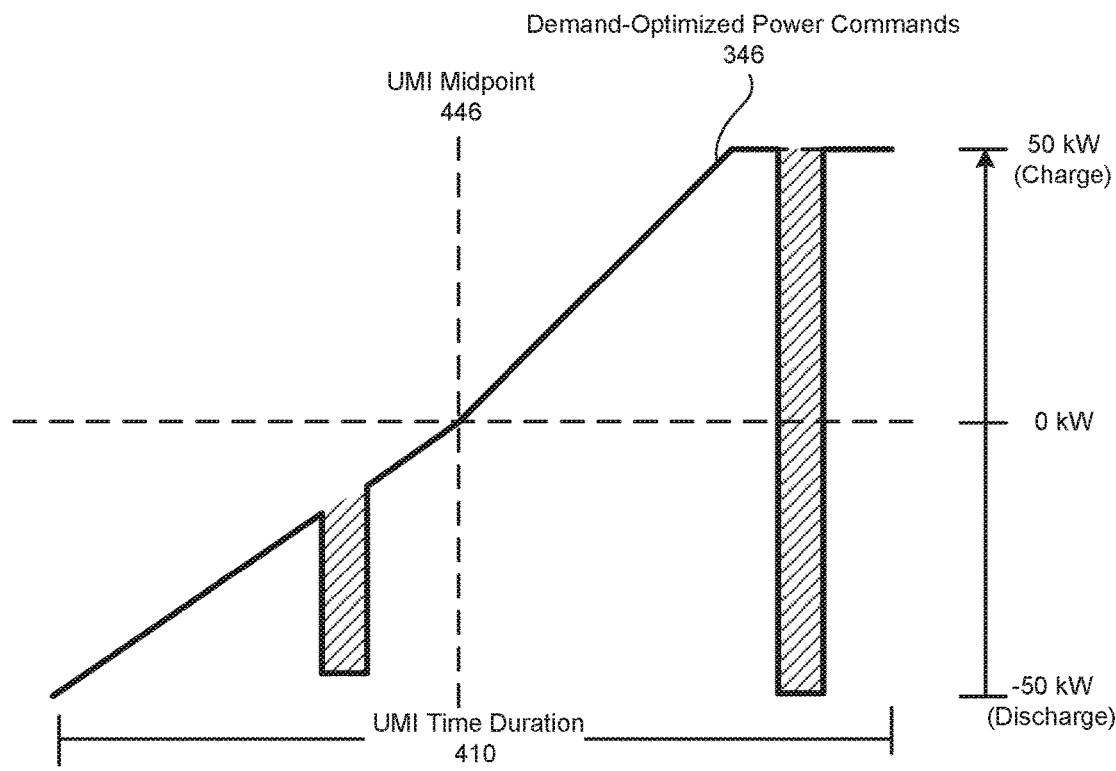

FIG. 6 illustrates an example of the optimized discharge and charge commands that the hedge mode plugin 320 of FIG. 4 may be configured to generate, according to various embodiments of the present invention. For explanatory purposes only, the hedge mode plugin 320 is configured to implement the linear guidelines 506 of FIG. 5B. As shown, the hedge mode plugin 320 parameterizes the linear guidelines 506 based on the discharge power limit 522 of −50 kW and the charge power limit 524 of 50 kW. The power rating of the energy storage device 224 is 50 kW.

The top graph specifies the load 306 (in kW) over a single UMI, and the bottom graph specifies the corresponding power values specified by the demand-optimized power commands 346. For explanatory purposes, the top graph also depicts the UMI midpoint 446 that separates the UMI into the initial pre-charge phase and the subsequent compensatory charge phase. During the pre-charge phase, the load 306 is zero except for a brief load spike 610. Accordingly, during the pre-charge phase, the power values specified by the demand-optimized power commands 346 follow the linear discharge guideline 442 except for the time corresponding to the load spike 610. During the load spike 610, the demand optimization engine 480 does not override the set-point power commands 336. Consequently, the power values specified by the demand-optimized power commands 346 exhibit a negative spike during the load spike 610. The negative spike reflects that the set-point power commands 336 configure the memory storage device 224 to release additional power to prevent the net load of the electrical load location 104 from exceeding the set-point 334.

During the charge phase, the load 306 is zero except for a power limited event 650. Accordingly, during the charge phase, the power values specified by the demand-optimized power commands 346 follow the linear charge guideline 448 except for the time corresponding to the power limited event 650. During the power limited event 650, the demand optimization engine 480 does not override the set-point power commands 336. Consequently, the power values specified by the demand-optimized power commands 346 exhibit a negative spike during the power limited event 650. The negative spike reflects that the set-point power commands 336 configure the memory storage device 224 to discharge at the maximum capacity of the memory storage device 224 in an attempt to prevent the net load of the electrical load location 104 from exceeding the set-point 334. The system controller 210 is unable to prevent the net load of the electrical load location from exceeding the set-point 334 during the power limited event 650. However, because the demand optimization engine 480 overrides the set-point power commands 336 during the majority of the pre-charge phase and causes the energy storage device 224 to preemptively discharge, the net load over the UMI is reduced.

Figure 7:
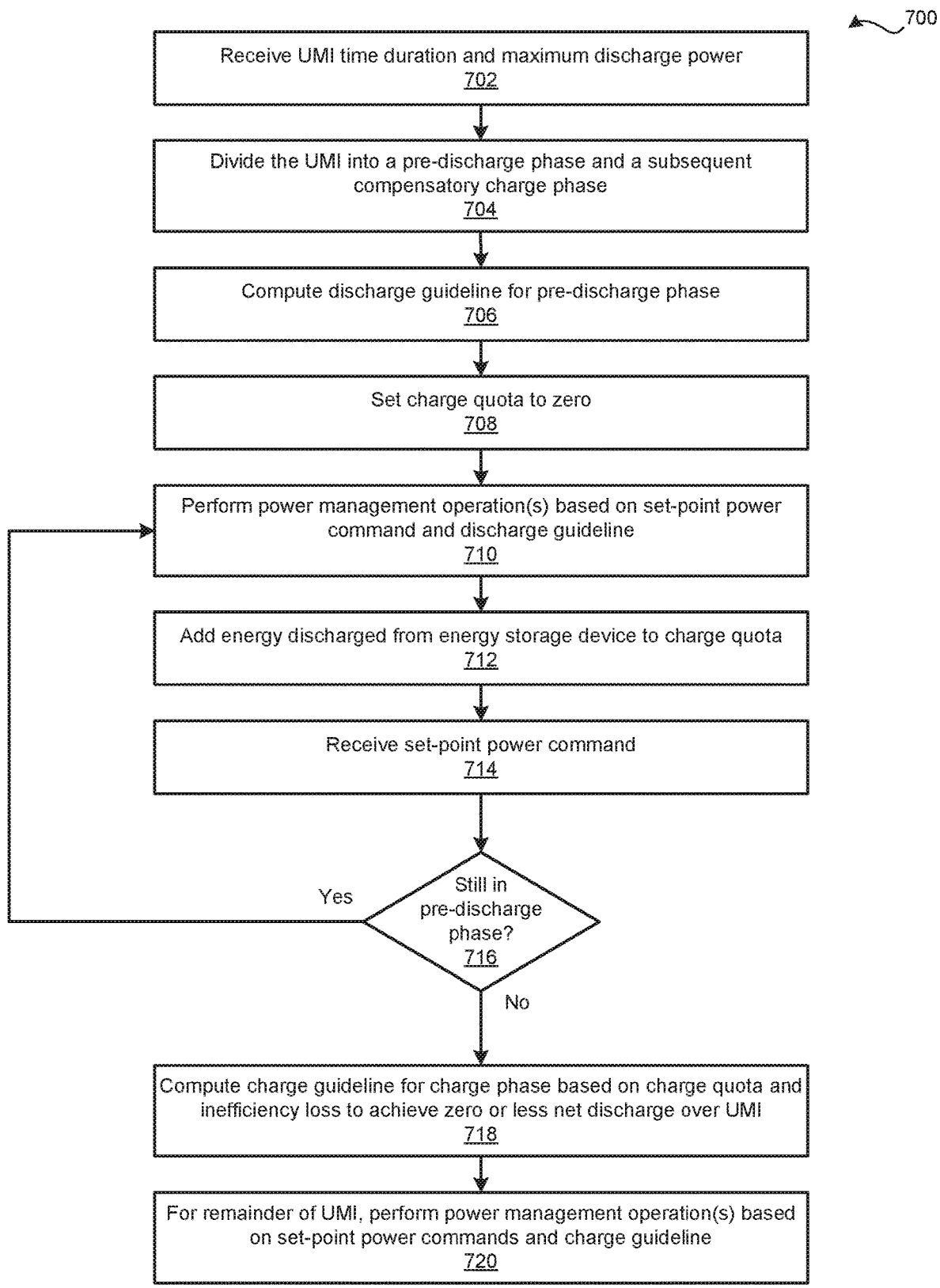
FIG. 7 is a flow diagram of method steps for controlling an energy storage device to manage power limited events, according to various embodiments of the present invention.

FIG. 7 is a flow diagram of method steps for controlling an energy storage device to manage power limited events, according to various embodiments of the present invention. Although the method steps are described with reference to the systems of FIGS. 1-6, persons skilled in the art will understand that any system configured to implement the method steps, in any order, falls within the scope of the present invention. The context of FIG. 7 is that the hedge mode plugin 340 implements the method steps over each utility measurement interval (UMI) to manage power limited events as part of an overall management strategy that is designed to reduce costs associated with purchasing energy from the electric grid 102.

As shown, a method 700 begins at step 702, where the hedge mode plugin 340 receives the utility measurement interval (UMI) time duration 510 and the maximum discharge power 420. The maximum discharge power 420 may be received from any element included the system controller 210 and specifies the amount of power that is allocated to the hedge mode plugin 340 for increasing demand reduction effectiveness. In general, the maximum discharge power 420 may be determined based on any number of system characteristics and any number of optimization criteria in any technically feasible fashion. For example, in some embodiments, the solution manager 202 computes the maximum discharge power 420 based on the state-of-charge 302 of the energy storage device 224 and the time-dependent energy cost 304.

At step 704, the hedge mode plugin 340 divides the UMI into a pre-discharge phase and a subsequent compensatory charge phase. The hedge mode plugin 340 may divide the UMI in any technically feasible fashion. For example, in some embodiments, the hedge mode plugin 340 bisects the UMI with respect to time at the UMI midpoint 446. The first half of the UMI is the pre-discharge phase and the second half of the UMI is the subsequent compensatory charge phase. At step 706, the hedge mode plugin 340 computes the discharge guideline 442. For each time tick included in the pre-discharge phase, the discharge guideline 442 includes a negative power value based on a discharge curve. The hedge mode plugin 340 may implement any type of discharge guideline 442 based on any type of discharge curve in any technically feasible fashion.

For example, in some embodiments, the hedge mode plugin 340 computes each of the power values included in the discharge guideline 442 based on the Bezier curve functions 560. As described previously in FIG. 5, the hedge mode plugin 340 may parameterize the Bezier curve functions 560 based on a length (in time) of the pre-discharge phase, the maximum discharge power 422, and a curvature vector. For each time tick, the time is specified relative to the beginning of the pre-discharge phase. For instance, if the duration between time ticks is 1 second, then the time associated with the first time tick in the pre-discharge phase is 1 second, the time associated with the second time tick in the pre-discharge phase is 2 seconds, and so forth. The curvature vector specifies the aggressiveness of the discharge guideline 442 and may be determined in any technically feasible fashion. For example, in some embodiments, the curvature vector may be specified through a user interface or an application programming interface. In other embodiments, the curvature vector may be set to a default value.

At step 708, the hedge mode plugin 340 sets the charge quota 444 to zero. At step 710, the hedge mode plugin 340 performs power management operation(s) based on the discharge guideline 442 and the current time tick. The hedge mode plugin 340 may perform any number and type of power management operations designed to increase the demand reduction efficiency of the energy storage device 224 based on the discharge guideline 442. For example, in some embodiments, as described previously in FIG. 4, the hedge mode plugin 340 may selectively override the set-point power command 336 received from other components included in the system controller 210 to generate the demand-optimized power command 346. At step 712, the hedge mode plugin 340 adds the magnitude (i.e., absolute value) of the energy discharged from the energy storage device 224 during the time tick to the charge quota 444. In general, the hedge mode plugin 320 determines the energy discharged from the energy storage device 224 based on the final power commands 398 generated by the offset controller 208. In this fashion, the charge quota 444 tracks the total amount of energy discharged from the energy storage device 224 over the UMI as a positive amount of energy.

At step 714, the hedge mode plugin 340 receives the set-point power command 336. At step 716, the hedge mode plugin 350 determines whether the current time lies within the pre-discharge phase. If, at step 716, the hedge mode plugin 340 determines that the current time lies within the pre-discharge phase, then the method 700 returns to step 710, where the hedge mode plugin 340 performs power management operation(s) based on the set-point power command 336 and the discharge guideline 442. The hedge mode plugin 340 continues to cycle through steps 710-716, performing power management operations based on the set-point power command 336 and the discharge guideline 442 until the pre-discharge phase is complete If, however, at step 716, the hedge mode plugin 340 determines that the current time does not lie within the pre-discharge phase, then the method 700 proceeds to step 718. At step 718, the hedge mode plugin 340 computes the charge guideline 448 based on the charge quota 444 and an inefficiency loss associated with the energy storage device 224. More specifically, the hedge mode plugin 340 enforces the hedge mode constraint 450 that the total energy associated with the charge guideline 448 is greater than or equal to the sum of the charge quota 444 and the total inefficiency loss over the UMI. In this fashion, the hedge mode constraint 450 stabilizes the capacity resources (e.g., the state-of-charge 302) of the energy storage device 224 over multiple UMIs.

In general, the charge guideline 448 includes a positive power value for each of the time ticks included in the compensatory charge interval. The hedge mode plugin 340 may implement any type of charge guideline 448 based on any type of charge curve in any technically feasible fashion that is consistent with the hedge mode constraint 450. For example, in some embodiments, the hedge mode plugin 340 iteratively parameterizes the Bezier curve functions 560 based on the hedge mode constraint 450 and then computes the power values for the charge guideline 448 based on the resulting parameterized curve. In such embodiments, the hedge mode plugin 340 initially sets the curvature vector to a first set of values that specify a relatively unaggressive curve to generate a potential guideline. The hedge mode plugin 340 integrates the potential guideline to determine an amount of compensatory energy that, if the hedge mode plugin 340 were to implement the potential guideline, would be stored in the energy storage device 224.

If the compensatory energy is greater than or equal to the sum of the charge quota 444 and the total inefficiency loss over the UMI, then the hedge mode plugin 340 sets the charge guideline 448 equal to the potential guideline. If the compensatory energy is less than the sum of the charge quota 444 and the total inefficiency loss over the UMI, then the hedge mode plugin sets the curvature vector to another set of values that specifies a more aggressive curve to generate a new potential guideline. The hedge mode plugin 340 repeats the process of increasing the aggressiveness of the potential guideline until the compensatory energy is greater than or equal to the sum of the charge quota 444 and the inefficiency loss. The hedge mode plugin 340 then sets the charge guideline 448 based on this optimized potential guideline.

At step 720, for the remainder of the UMI, the hedge mode plugin 340 performs power management operations based on the set-point power commands 336 and the charge guideline 448. The hedge mode plugin 340 may perform any number and type of power management operations designed to increase the overall demand reduction efficiency of the energy storage device 224 based on the charge guideline 448. For example, in some embodiments, as described previously in FIG. 4, the hedge mode plugin 340 may selectively override the set-point power commands 336 received from other components included in the system controller 210 to generate the demand-optimized power commands 346. The method 700 then terminates.

Figure 8:
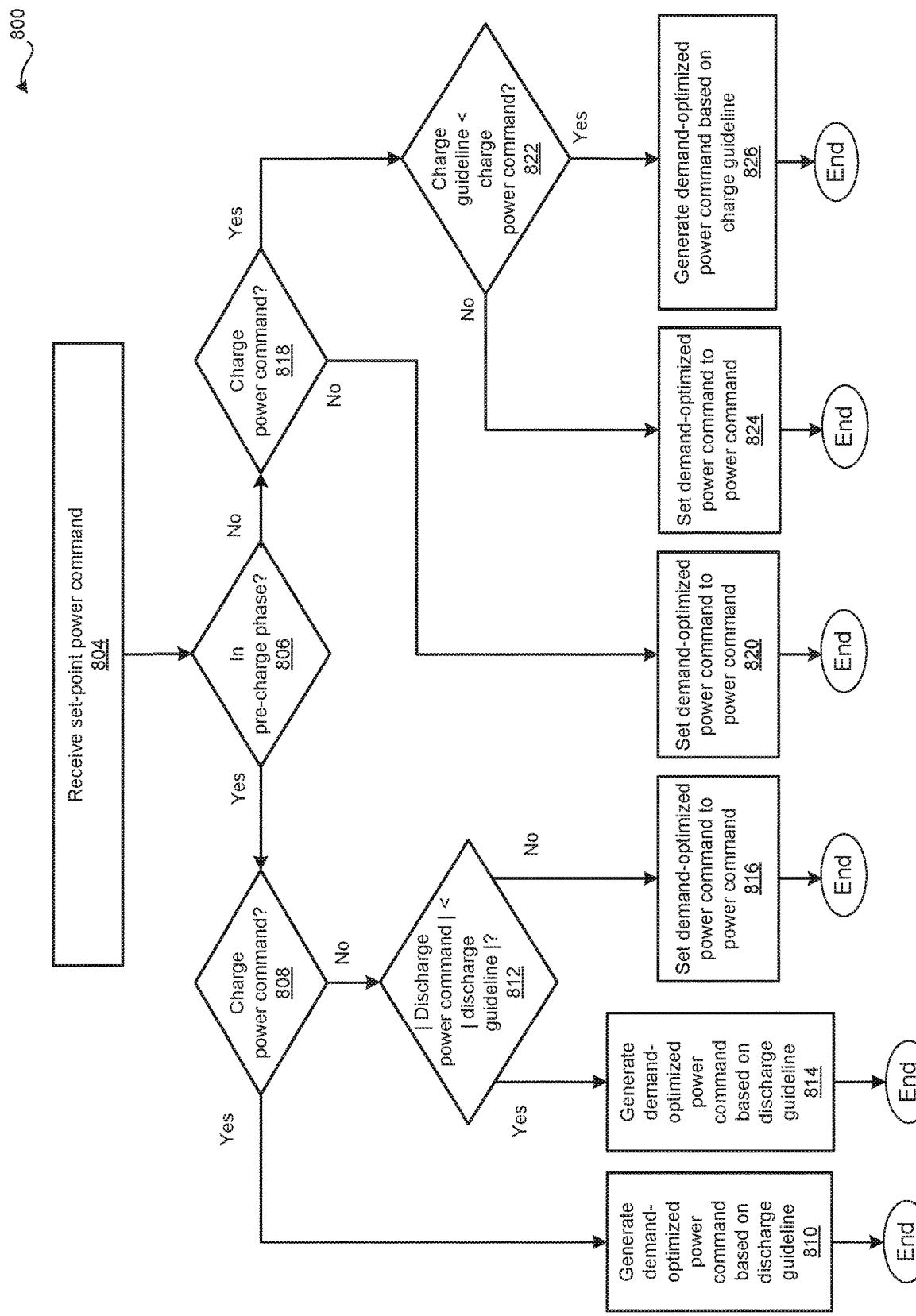
FIG. 8 is a flow diagram of method steps for controlling the discharge and charge cycles of an energy storage device, according to various embodiments of the present invention.

FIG. 8 is a flow diagram of method steps for controlling the discharge and charge cycles of an energy storage device, according to various embodiments of the present invention. Although the method steps are described with reference to the systems of FIGS. 1-6, persons skilled in the art will understand that any system configured to implement the method steps, in any order, falls within the scope of the present invention. The context of FIG. 6 is that the hedge mode plugin 340 computes the discharge guideline 442 at the start of a utility measurement interval (UMI) and the charge guideline 448 at the UMI midpoint 446.

As shown, a method 800 beings at step 804, where the demand optimization engine 480 included in the hedge mode plugin 340 receives the set-point power command 336 from the run-time controller 206. In alternate embodiments, the demand optimization engine 480 may receive any default power command from any source included in the system controller 210. At step 806, the demand optimization engine 480 determines whether the current time lies within the pre-charge phase of the UMI 510 based on comparing the current time to the UMI midpoint 446. In alternate embodiments, the demand optimization engine 480 may determine whether the current time lies within the pre-charge phase of the UMI 510 in any technically feasible fashion.

If, at step 806, the demand optimization engine 480 determines that the current time is less than or equal to the UMI midpoint 446 (i.e., the current time lies within the pre-charge phase of the UMI 510), then the method 800 proceeds to step 808. At step 808, the demand optimization engine 480 determines whether the set-point power command 336 is a command to charge the energy storage device 224. The demand optimization engine 480 may determine whether the set-point power command 336 is a command to charge the energy storage device 224 in any technically feasible fashion. For example, if the power value specified by the set-point power command 336 is positive, then the demand optimization engine 480 may determine that the set-point power command 336 is a command to charge the energy storage device 224. If, at step 808, the demand optimization engine 480 determines that the set-point power command 336 is a command to charge the energy storage device 224, then the method proceeds to step 810. At step 810, the demand optimization engine 480 generates the demand-optimized power command 346 that specifies the power value included in the discharge guideline 442 and associated with the current tick. As described previously herein, the current time tick is the discretized current time. The method 800 then terminates.

If, however, at step 808, the demand optimization engine 480 determines that the set-point power command 336 is not a command to charge the energy storage device 224, then the method 800 proceeds directly to step 812. At step 812, the demand optimization engine 480 compares the discharge power value specified by the set-point power command 336 to the power value included in the discharge guideline 442 and associated with the current time tick. If, at step 812, the demand optimization engine 480 determines that the magnitude (i.e., absolute value) of the power value specified by the set-point power command 336 is less than the magnitude of the power value included in the discharge guideline 442 and associated with the current time tick, then the method 800 proceeds to step 814. At step 814, the demand optimization engine 480 generates the demand-optimized power command 346 that specifies the power value included in the discharge guideline 442 and associated with the current time tick, and the method 800 terminates.

If, however, at step 812, the demand optimization engine 480 determines that the magnitude of the power value specified by the set-point power command 336 is greater than or equal to the magnitude of the power value included in the discharge guideline 442 and associated with the current time tick, then the method 800 proceeds directly to step 816. At step 816, the demand optimization engine 480 sets the demand-optimized power command 346 equal to the set-point power command 336, and the method 800 terminates.

If, however, at step 806, the demand optimization engine 480 determines that the current time tick is greater than the UMI midpoint 446 (i.e., the current time lies within the compensatory charge phase), then the method 800 proceeds directly to step 818. At step 818, the demand optimization engine 480 determines whether the set-point power command 336 is a command to charge the energy storage device 224. If, at step 818, the demand optimization engine 480 determines that the set-point power command 336 is not a command to charge the energy storage device 224, then the method proceeds to step 820. At step 820, the demand optimization engine 480 sets the demand-optimized power command 346 equal to the set-point power command 336, and the method 800 terminates. In this fashion, the demand optimization engine 480 ensures that if the set-point power command 336 attempts to supply power to offset the load 306 during the compensatory charge phase, then the set-point power command 336 is not altered by the demand optimization engine 480. For example, if the set-point power command 336 specifies a maximum power discharge to address the power limited event 650, then the demand optimization engine 480 relays the set-point power command 336 as the demand-optimized power command 346 irrespective of the charge guideline 448.

If, at step 818, the demand optimization engine 480 determines that the set-point power command 336 is a command to charge the energy storage device 224, then the method proceeds directly to step 822. At step 822, the demand optimization engine 480 compares the power value specified by the set-point power command 336 to the power value included in the charge guideline 448 and associated with the current time tick. If, at step 822, the demand optimization engine 480 determines that the power value specified by the set-point power command 336 is less than or equal to the power value included in the charge guideline 448 and associated with the current time tick, then the method 800 proceeds to step 824. At step 824, the demand optimization engine 480 sets the demand-optimized power command 346 equal to the set-point power command 336, and the method 800 terminates.

If, however, at step 822, the demand optimization engine 480 determines that the power value specified by the set-point power command 336 is greater than the power value included in the charge guideline 448 and associated with the current time tick, then the method 800 proceeds to step 826. At step 826, the demand optimization engine 480 generates the demand-optimized power command 346 that specifies the power value included in the charge guideline 448 and associated with the current time tick, and the method 800 terminates.

In sum, the disclosed techniques may be used to optimize the efficiency of an energy storage device across a utility measurement interval (UMI). An energy storage system includes the energy storage device, a power monitor that measures customer load, and a system controller that manages the transfer of power from the energy storage device and an electric grid managed by a utility company. The system controller includes a variety of software controlling elements that work together to discharge and charge the energy storage device in order to reduce the cost of purchasing energy from the electric grid. For example, a set-point controller and a run-time controller collaborate to generate set-point power commands that attempt to adjust the customer demand from the electric grid to an optimized set-point. An offset controller then adjusts these set-point power commands based on a variety of optimization criterion implemented within a semi-hierarchical system of plugins.

In particular, a hedge mode plugin included in the offset controller adjusts the set-point power commands based on a pre-discharge guideline and a compensatory charge guideline. The guidelines are a set of power values indexed by time ticks that, together, reduce the average customer demand from the electric grid over the UMI while maintaining a net zero state-of-charge for the energy storage device over the UMI. At the beginning of each UMI, the hedge mode plugin generates the discharge guideline for the first half of the UMI based on the amount of power allocated for UMI power management and the time duration of the UMI. During the first half of the UMI, the hedge mode plugin tracks the total power discharged from the energy storage device. At the beginning of the second half of the UMI, based on the total power discharged from the energy storage device, the hedge mode plugin generates a charge guideline for the second half of the UMI that ensures a net zero state-of-charge for the energy storage device over the UMI.

Throughout the UMI, a demand optimization engine included in the hedge mode plugin selectively adjusts the set-point power commands received from the run-time controller based on the discharge and charge guidelines to generate demand-optimized power commands. More specifically, during the first half of the UMI, if the set-point power command is a charge command, then the demand optimization engine generates a demand-optimized power command that specifies the power value included in the discharge guideline and associated with the current time tick. Similarly, if the set-point power command is a discharge command that specifies a power value that has a magnitude that is less than the magnitude of the power value included in the discharge guideline and associated with the current time tick, then the demand optimization engine generates a demand-optimized power command that specifies the power value included in the discharge guideline and associated with the current time tick. By contrast, if the set-point power command is a discharge command that specifies a power value that has a magnitude that is greater than or equal to the magnitude of the power value that is specified by the discharge guideline and associated with the current time tick, then the demand optimization engine does not adjust the set-point power command.

During the second half of the UMI, if the set-point power command is a charge command that specifies a power value that is greater than or equal to the power value included in the charge guideline and associated with the current time tick, then the demand optimization engine overrides the set-point power command. More specifically, the demand optimization engine generates a charge command that specifies the power value included in the charge guideline and associated with the current time tick. By contrast, if the set-point power command is a discharge command or a charge command that specifies a power value that is less than the power value included in the charge guideline and associated with the current time tick, then the demand optimization engine does not adjust the set-point power command.

Advantageously, the techniques described herein enable customers to optimize the efficiency of energy storage devices to reduce total energy costs. In particular, by pre-emptively discharging the energy storage device during the first half of a UMI, the hedge mode plugin enables the energy storage system to effectively mitigate a power limited event over the entire UMI irrespective of when the power limited event occurs. Accordingly, the efficiency of the energy storage device is optimized, the average customer demand from the utility company over the UMI is reduced, and the total energy cost is reduced. Further, because the hedge mode plugin re-charges the energy storage device during the compensatory charge phase, the hedge mode plugin restores the ability of the energy storage system to minimize the demand from the electric grid during future UMIs.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow

What is claimed is:

1. A computer-implemented method for controlling an energy storage device to manage power-limited events, the method comprising:
    computing a plurality of discharge values, wherein each discharge value included in the plurality of discharge values corresponds to a distinct time that lies within a pre-discharge phase of a utility measurement interval and is based on the distinct time and a pre-defined discharge curve that comprises one of a linear function or a Bezier function;

during the pre-discharge phase, causing the energy storage device to discharge electrical energy based on at least one discharge value included in the plurality of discharge values;

at a predetermined time that separates the pre-discharge phase from a compensatory charge phase of the utility measurement interval, computing a plurality of charge values based on a total amount of electrical energy that is discharged from the energy storage device during the pre-discharge phase; and during the compensatory charge phase, causing the energy storage device to perform a charging operation based on at least one charge value included in the plurality of charge values.

2. The method of claim 1, wherein computing the plurality of charge values comprises:

computing a target amount of compensation energy based on the total amount of electrical energy that is discharged from the energy storage device during the pre-discharge phase and an efficiency loss that is associated with the energy storage device;

parameterizing, based on the target amount of compensation energy, a pre-defined charge curve to generate a parameterized charge curve; and for each of a plurality of times that lie within the compensatory charge phase, computing a charge value that is included in the plurality of charge values and is based on the parameterized charge curve and the time.

3. The method of claim 2, wherein the pre-defined charge curve comprises a linear function or a Bezier function.

4. The method of claim 2, wherein parameterizing the pre-defined charge curve comprises:

selecting a first set of values for parameters associated with the pre-defined charge curve to generate a first potential charge curve;

integrating the first potential charge curve over a time duration of the compensatory charge phase to produce a first total charge energy; and determining that the first total charge energy is greater than or equal to the target amount of compensation energy.

5. The method of claim 2, wherein parameterizing the pre-defined charge curve comprises:

determining that a first total charge energy associated with a first set of values for parameters associated with the pre-defined charge curve is less than the target amount of compensation energy;

modifying at least one value included in the first set of values to generate a second set of values for the parameters; and determining that a second total charge associated with the second set of values for the parameters is greater than or equal to the target amount of compensation energy.

6. The method of claim 5, wherein the parameters comprise curvature vector parameters.

7. The method of claim 1, wherein causing the energy storage device to discharge comprises transmitting a discharge command that specifies the at least one of the discharge values included in the plurality of discharge values to a system controller that controls the energy storage device.

8. One or more non-transitory computer-readable media storing instructions that, when executed by one or more processors, cause the one or more processors to control an energy storage device to manage power-limited events by performing the steps of:

computing a plurality of discharge values, wherein each discharge value included in the plurality of discharge values corresponds to a distinct time that lies within a pre-discharge phase of a utility measurement interval and is based on the distinct time and a pre-defined discharge curve that comprises one of a linear function or a Bezier function;

during the pre-discharge phase, causing the energy storage device to discharge electrical energy based on at least one discharge value included in the plurality of discharge values;

at a predetermined time that separates the pre-discharge phase from a compensatory charge phase of the utility measurement interval, computing a plurality of charge values based on a total amount of electrical energy that is discharged from the energy storage device during the pre-discharge phase; and during the compensatory charge phase, causing the energy storage device to perform a charging operation based on at least one charge value included in the plurality of charge values.

9. The one or more non-transitory computer-readable media of claim 8, wherein computing the plurality of charge values comprises:

computing a target amount of compensation energy based on the total amount of electrical energy that is discharged from the energy storage device during the pre-discharge phase and an efficiency loss that is associated with the energy storage device;

parameterizing, based on the target amount of compensation energy, a pre-defined charge curve to generate a parameterized charge curve; and for each of a plurality of times that lie within the compensatory charge phase, computing a charge value that is included in the plurality of charge values and is based on the parameterized charge curve and the time.

10. The one or more non-transitory computer-readable media of claim 9, wherein parameterizing the pre-defined charge curve comprises:

determining that a first total charge energy associated with a first set of values for parameters associated with the pre-defined charge curve is less than the target amount of compensation energy;

modifying at least one value included in the first set of values to generate a second set of values for the parameters; and determining that a second total charge associated with the second set of values for the parameters is greater than or equal to the target amount of compensation energy.

11. The one or more non-transitory computer-readable media of claim 10, wherein the parameters comprise curvature vector parameters.

12. The one or more non-transitory computer-readable media of claim 8, wherein causing the energy storage device to perform a charging operation comprises transmitting a charge command that specifies the at least one of the charge values included in the plurality of charge values to a system controller that controls the energy storage device.

13. A system configured to control an energy storage device to manage power-limited events, the system comprising:

a memory storing a hedge mode application; and a processor that is coupled to the memory and, when executing the hedge mode application, is configured to:

compute a plurality of discharge values, wherein each discharge value included in the plurality of discharge values corresponds to a distinct time that lies within a pre-discharge phase of a utility measurement interval and is based on the distinct time and a pre-defined discharge curve that comprises one of a linear function or a Bezier function, during the pre-discharge phase, cause the energy storage device to discharge electrical energy based on at least one discharge value included in the plurality of discharge values, at a predetermined time that separates the pre-discharge phase from a compensatory charge phase of the utility measurement interval, compute a plurality of charge values based on a total amount of electrical energy that is discharged from the energy storage device during the pre-discharge phase, and during the compensatory charge phase, cause the energy storage device to perform a charging operation based on at least one charge value included in the plurality of charge values.

14. The system of claim 13, wherein the hedge mode application configures the processor to compute the plurality of charge values by:

computing a target amount of compensation energy based on the total amount of electrical energy that is discharged from the energy storage device during the pre-discharge phase and an efficiency loss that is associated with the energy storage device;

parameterizing, based on the target amount of compensation energy, a pre-defined charge curve to generate a parameterized charge curve; and for each of a plurality of times that lie within the compensatory charge phase, computing a charge value that is included in the plurality of charge values and is based on the parameterized charge curve and the time.

15. The system of claim 13, wherein the predetermined time comprises a time that bisects the utility measurement interval with respect to time.

16. The system of claim 13, wherein the energy storage device comprises one or more battery appliances.

* * * * *